United States Patent
Im et al.

(10) Patent No.: US 12,180,335 B2
(45) Date of Patent: Dec. 31, 2024

(54) POLYCARBONATE DIOL DERIVED FROM ETHER DIOL OF ANHDROHEXITOL AND PREPARATION METHOD THEREOF, AND POLYURETHANE PREPARED THEREFROM AND ADHESIVE COMPRISING THE SAME

(71) Applicant: SAMYANG CORPORATION, Seoul (KR)

(72) Inventors: Jun Seop Im, Hwaseong-si (KR); Seung Hyun Yoo, Daejeon (KR); Hoon Ryu, Daejeon (KR); Won Hyun Jeon, Seoul (KR)

(73) Assignee: SAMYANG CORPORATION, Seoul (KR)

( * ) Notice: Subject to any disclaimer, the term of this patent is extended or adjusted under 35 U.S.C. 154(b) by 377 days.

(21) Appl. No.: 17/614,772

(22) PCT Filed: May 28, 2020

(86) PCT No.: PCT/KR2020/006927
§ 371 (c)(1),
(2) Date: Nov. 29, 2021

(87) PCT Pub. No.: WO2020/242224
PCT Pub. Date: Dec. 3, 2020

(65) Prior Publication Data
US 2022/0227927 A1 Jul. 21, 2022

(30) Foreign Application Priority Data

May 31, 2019 (KR) .................. 10-2019-0064191
Jun. 3, 2019 (KR) .................. 10-2019-0065442

(51) Int. Cl.
C08G 64/30 (2006.01)
C08G 18/10 (2006.01)
C08G 18/44 (2006.01)
C08G 18/76 (2006.01)
C08G 64/02 (2006.01)
C09D 175/06 (2006.01)
C09J 175/06 (2006.01)

(52) U.S. Cl.
CPC ............. *C08G 64/30* (2013.01); *C08G 18/10* (2013.01); *C08G 18/44* (2013.01); *C08G 18/7671* (2013.01); *C08G 64/02* (2013.01); *C09D 175/06* (2013.01); *C09J 175/06* (2013.01)

(58) Field of Classification Search
CPC ........ C08G 64/30; C08G 64/02; C08G 18/44; C09D 175/06; C09J 175/06
See application file for complete search history.

(56) References Cited

U.S. PATENT DOCUMENTS

| 10,907,012 B2 | 2/2021 | Kusaka et al. |
| 2003/0212244 A1 | 11/2003 | Hayes et al. |
| 2011/0034616 A1* | 2/2011 | Noordover ........... C09D 169/00 524/590 |
| 2013/0109804 A1 | 5/2013 | Kusaka et al. |

FOREIGN PATENT DOCUMENTS

| EP | 3 643 732 A1 | 4/2020 | |
| JP | 2013142128 A * | 7/2013 | ............. C08G 18/40 |
| KR | 10-1079518 B1 | 11/2011 | |
| KR | 10-2012-0066904 A | 6/2012 | |
| KR | 10-2013-0092383 A | 8/2013 | |
| KR | 10-1840063 B1 | 4/2018 | |
| KR | 10-2019-0000419 A | 1/2019 | |
| KR | 10-2019-0054913 A | 5/2019 | |
| WO | WO 2012/081785 A1 | 6/2012 | |

OTHER PUBLICATIONS

JP-2013142128-A __—Jul. 2013_English Translation.*
International Search Report for PCT/KR2020/006927 mailed on Sep. 10, 2020.

* cited by examiner

*Primary Examiner* — Michael L Leonard
(74) *Attorney, Agent, or Firm* — Birch, Stewart, Kolasch & Birch, LLP

(57) ABSTRACT

A polycarbonate diol is derived from ether diol of anhydrohexitol, a preparation method thereof, a polyurethane prepared therefrom, and adhesive, etc. including the same. More specifically, the polycarbonate diol includes repeated units derived from ether diol of anhydrohexitol; and carbonate diester; and optionally anhydrohexitol; and thereby showing better effect of improving color as compared with conventional polycarbonate diol, and being capable of providing polyurethane prepared therefrom with remarkably improved adhesion strength (T-peel strength or shear strength), preparation method thereof, polyurethane prepared therefrom, and adhesive, paint and coating agent including the same.

29 Claims, No Drawings

POLYCARBONATE DIOL DERIVED FROM ETHER DIOL OF ANHDROHEXITOL AND PREPARATION METHOD THEREOF, AND POLYURETHANE PREPARED THEREFROM AND ADHESIVE COMPRISING THE SAME

TECHNICAL FIELD

The present invention relates to polycarbonate diol derived from ether diol of anhydrohexitol, preparation method thereof, polyurethane prepared therefrom, and adhesive, etc. comprising the same, and more specifically, the present invention relates to polycarbonate diol comprising repeated units derived from ether diol of anhydrohexitol; and carbonate diester; and optionally anhydrohexitol; and thereby showing better effect of improving color as compared with conventional polycarbonate diol, and being capable of providing polyurethane prepared therefrom with remarkably improved adhesion strength (T-peel strength or shear strength), preparation method thereof, polyurethane prepared therefrom, and adhesive, paint and coating agent comprising the same.

BACKGROUND ART

Anhydrosugar alcohol has a diol form with two hydroxyl groups in the molecule, and can be produced by using hexitol derived from starch (for example, Korean Patent No. 10-1079518 and Korean Laid-open Patent Publication No. 10-2012-0066904). Because anhydrosugar alcohol is an environment-friendly material derived from recyclable natural resources, it has received much interest for a long time and researches on its production continue to proceed. Among such anhydrosugar alcohols, isosorbide produced from sorbitol has the widest industrial applicability at present.

Anhydrosugar alcohol can be used in various fields including treatment of heart and blood vessel diseases, patch adhesive, medicaments such as mouthwash, etc., solvents for compositions in the cosmetics industry, emulsifiers in the food industry, etc. In addition, it can increase the glass transition temperature of polymer materials like polyester, PET, polycarbonate, polyurethane, epoxy resin, etc., and improve the strength of such materials. Furthermore, because anhydrosugar alcohol is an environment-friendly material derived from natural resources, it is very useful in the plastics industry such as bioplastics and the like. It is also known that anhydrosugar alcohol can be used as an adhesive, environment-friendly plasticizer, biodegradable polymer, and environment-friendly solvent for water-soluble lacquer. As such, anhydrosugar alcohol is receiving much interest because of its wide applicability, and the level of practical industrial application thereof is increasing, and dianhydrohexitol, which is a dehydration product of hexitol, can be used preferably as anhydrosugar alcohol.

Polycarbonate diol is a product obtained by reacting diol component and carbonate diester component in the presence of a transesterification catalyst, and it is mainly used as a raw material for preparing polyurethane. Conventionally and widely used polycarbonate diol is a product prepared by using aliphatic diol (mainly hexane diol). However, when polyurethane prepared from such polycarbonate diol is utilized in applications of coating, adhesive, etc., it has flexibility from the aliphatic diol, but its hardness and scratch resistance are low so that the application thereof is limited.

To resolve such problems, Korean Patent No. 10-1840063 suggested preparation of polycarbonate diol by using bio-based isosorbide and aliphatic diol in combination as diol component for the purpose of improving the hardness or strength. In case of such polycarbonate diol, the hardness and strength, etc. are improved as compared with conventional polycarbonate diol prepared by using aliphatic diol only as diol component, but there is a problem of decreased adhesion strength (T-peel strength or shear strength) when utilized for adhesive application.

PROBLEMS TO BE SOLVED

The purpose of the present invention is to provide polycarbonate diol showing better effect of improving color as compared with conventional polycarbonate diol, and being capable of providing polyurethane prepared therefrom with remarkably improved adhesion strength (T-peel strength or shear strength), preparation method thereof, polyurethane prepared therefrom, and adhesive, paint and coating agent comprising the same.

TECHNICAL MEANS

In order to achieve the above-stated purpose, the present invention provides a polycarbonate diol comprising: (1) repeated units derived from ether diol of anhydrohexitol; and (2) repeated units derived from carbonate diester.

In an embodiment, the polycarbonate diol of the present invention further comprises (3) repeated units derived from anhydrohexitol.

In an embodiment, the polycarbonate diol of the present invention comprises repeated units having a structure of the following formula 1:

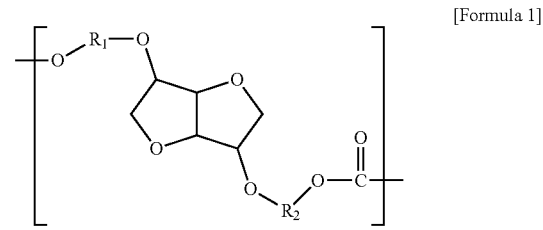

[Formula 1]

wherein each of $R_1$ and $R_2$ is independently a linear or branched alkylene group having 2 to 20 carbons, and $R_1$ and $R_2$ may be the same or different from each other.

In an embodiment, the polycarbonate diol of the present invention further comprises repeated units having a structure of the following formula 2:

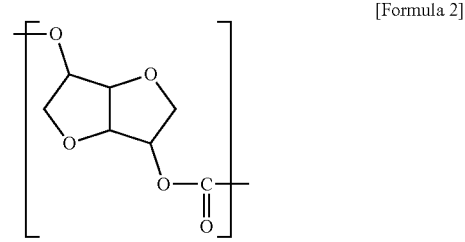

[Formula 2]

In another aspect, the present invention provides a method for preparing a polycarbonate diol, comprising a step of reacting a mixture comprising (i) ether diol of anhydrohexitol and (ii) carbonate diester, in the presence of a transesterification catalyst.

In an embodiment, the mixture further comprises (iii) anhydrohexitol.

In another aspect, the present invention provides polyurethane comprising repeated units derived from the polycarbonate diol of the present invention.

In another aspect, the present invention provides a method for preparing polyurethane, comprising the steps of: reacting a polyol component and a polyisocyanate component to prepare a prepolymer; and reacting the prepolymer with a chain extender; the method being characterized in that the polyol component comprises the polycarbonate diol of the present invention.

In another aspect, the present invention provides an adhesive comprising the polyurethane of the present invention.

In another aspect, the present invention provides a paint comprising the polyurethane of the present invention.

In another aspect, the present invention provides a coating agent comprising the polyurethane of the present invention.

EFFECT OF THE INVENTION

The polycarbonate diol provided according to the present invention shows better effect of improving color as compared with conventional polycarbonate diol, and if polyurethane prepared therefrom is utilized, it is possible to obtain a polyurethane adhesive (particularly, adhesive for structure, adhesive for shoes, hot melt adhesive, etc.), a paint (particularly, waterborne paint) and a coating agent having remarkably improved adhesion strength (T-peel strength or shear strength) as compared with the cases using polyurethane prepared from conventional polycarbonate diol. In addition, according to the present invention, the reaction temperature can be lowered and the reaction time can be reduced as compared with conventional polycarbonate diol production processes using anhydrohexitol only, and thus it is possible to prevent color change in the finally prepared polycarbonate diol and minimize the residual amount of byproduct (for example, phenol).

CONCRETE MODE FOR CARRYING OUT THE INVENTION

The present invention is explained in more detail below.

The polycarbonate diol of the present invention comprises: (1) repeated units derived from ether diol of anhydrohexitol; and (2) repeated units derived from carbonate diester.

In an embodiment, the polycarbonate diol of the present invention may further comprise (3) repeated units derived from anhydrohexitol.

As the anhydrohexitol, preferably dianhydrohexitol which is a dehydration product of hexitol may be used, more preferably dianhydrohexitol selected from isosorbide (1,4: 3,6-dianhydrosorbitol), isomannide (1,4:3,6-dianhydromannitol), isoidide (1,4:3,6-dianhydroiditol) or mixtures thereof may be used, and most preferably isosorbide may be used.

The ether diol of anhydrohexitol is a diol compound derived from anhydrohexitol and having ether bond in the molecule, and it may be obtained by reacting anhydrohexitol and alkylene oxide, or obtained by reacting anhydrohexitol and alkylene carbonate (particularly, ethylene carbonate).

Concretely, the alkylene oxide may be a linear or branched alkylene oxide having 2 to 20 carbons, more concretely a linear or branched alkylene oxide having 2 to 10 carbons, still more concretely a linear or branched alkylene oxide having 2 to 8 carbons, and still more concretely a linear or branched alkylene oxide having 2 to 4 carbons. In an embodiment, the alkylene oxide may be ethylene oxide, propylene oxide or a combination thereof.

In an embodiment, the ether diol of anhydrohexitol obtained by reacting anhydrohexitol and alkylene oxide or alkylene carbonate (particularly, ethylene carbonate) may be a compound represented by the following formula A:

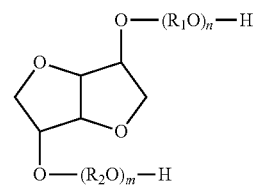

[Formula A]

wherein:

each of $R_1$ and $R_2$ is independently a linear or branched alkylene group having 2 to 20 carbons, more concretely a linear or branched alkylene group having 2 to 10 carbons, still more concretely a linear or branched alkylene group having 2 to 8 carbons, and still more concretely a linear or branched alkylene group having 2 to 4 carbons, each of m and n is independently represents an integer of 0 to 15, and m+n represents an integer of 1 to 30.

More preferably, in the above formula A, each of $R_1$ and $R_2$ independently represents ethylene group, propylene group or isopropylene group, and $R_1$ and $R_2$ may be the same or different from each other, but prepferably $R_1$ and $R_2$ are the same, each of m and n is independently represents an integer of 1 to 14, and m+n represents an integer of 2 to 15, and prepferably an integer of 3 to 15.

In an embodiment, as the ether diol of anhydrohexitol, the following isosorbide-propylene glycol, isosorbide-ethylene glycol or a mixture thereof may be used.

Isosorbide-propylene Glycol

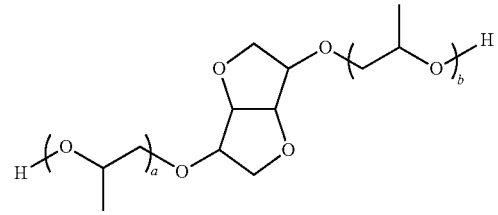

wherein:

each of a and b is independently represents an integer of 0 to 15, and prepferably an integer of 1 to 14, and a+b may be an integer of 1 to 30, prepferably an integer of 2 to 15, and more prepferably an integer of 3 to 15.

Isosorbide-ethylene Glycol

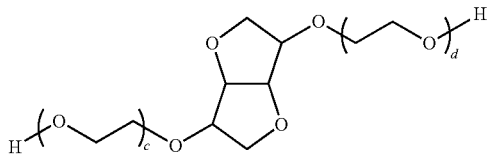

wherein:
each of c and d is independently represents an integer of 0 to 15, and prpferably an integer of 1 to 14, and
c+d may be an integer of 1 to 30, prepferably an integer of 2 to 15, and more prepferably an integer of 3 to 15.

The reaction of anhydrohexitol and alkylene oxide may be conducted, for example, in the presence of acid or alkali catalyst, at 100° C. to 150° C. for 3 hours to 8 hours, and more concretely at 100° C. to 140° C. for 5 hours to 6 hours, but it is not limited thereto.

The reaction of anhydrohexitol and alkylene carbonate (particularly, ethylene carbonate) may be conducted, for example, in the presence of acid or alkali catalyst, at 150° C. to 200° C. for 6 hours to 12 hours, and more concretely at 150° C. to 180° C. for 8 hours to 10 hours, but it is not limited thereto.

The kind of carbonate diester is not limited as long as the effect of the present invention is achieved, and for example, dialkyl carbonate, diaryl carbonate, alkylene carbonate or combinations thereof may be used.

In an embodiment, an example of the dialkyl carbonate may be dimethyl carbonate, diethyl carbonate, dibutyl carbonate, dicyclohexyl carbonate, diisobutyl carbonate, ethyl normal butyl carbonate, ethyl isobutyl carbonate, etc.; an example of the diaryl carbonate may be diphenyl carbonate, ditolyl carbonate, bis(chlorophenyl) carbonate, di-m-cresyl carbonate, etc.; and an example of the alkylene carbonate may be ethylene carbonate, trimethylene carbonate, tetramethylene carbonate, 1,2-propylene carbonate, 1,2-butylene carbonate, 1,3-butylene carbonate, 2,3-butylene carbonate, 1,2-pentylene carbonate, 1,3-pentylene carbonate, 1,4-pentylene carbonate, 1,5-pentylene carbonate, 2,3-pentylene carbonate, 2,4-pentylene carbonate, neopentylene carbonate, etc.

In an embodiment, the carbonate diester may be selected from dimethyl carbonate, diethyl carbonate, diphenyl carbonate, ethylene carbonate or combinations thereof, and more preferably it may be diphenyl carbonate.

In an embodiment, the amount of the repeated units derived from ether diol of anhydrohexitol in the polycarbonate diol of the present invention may be, based on total 100% by weight of repeated units in the polycarbonate diol, 15 to 80% by weight, more concretely 20 to 70% by weight, still more concretely 30 to 60% by weight, and still more concretely 40 to 55% by weight. If the amount of the repeated units derived from ether diol of anhydrohexitol in the polycarbonate diol is too less than the above level, although the hardness of polyurethane prepared by using the polycarbonate diol is improved, the temperature for preparation and use of the polyurethane becomes too high, and the flowability of the polyurethane decreases so that inconvenience may be caused when using the polyurethane. On the other hand, if the amount of the repeated units derived from ether diol of anhydrohexitol in the polycarbonate diol is too greater than the above level, the hardness of polyurethane prepared by using the polycarbonate diol is lowered and thus its scratch resistance may become poor, and the viscosity of the polyurethane is also lowered and thus its adhesion strength may become poor.

In an embodiment, the amount of the repeated units derived from carbonate diester in the polycarbonate diol of the present invention may be, based on total 100% by weight of repeated units in the polycarbonate diol, 10 to 50% by weight, more concretely 10 to 40% by weight, and still more concretely 15 to 36% by weight. In another embodiment, the amount of the repeated units derived from carbonate diester in the polycarbonate diol of the present invention may be, based on total 100% by weight of repeated units in the polycarbonate diol, 10 to 30% by weight, more concretely 10 to 20% by weight, and still more concretely 10 to 15% by weight. If the amount of the repeated units derived from carbonate diester in the polycarbonate diol is too less than the above level, the number average molecular weight of the polycarbonate diol becomes too low and thus the adhesion strength of polyurethane prepared by using it may become lowered. On the other hand, if the amount of the repeated units derived from carbonate diester in the polycarbonate diol is too greater than the above level, the number average molecular weight of the polycarbonate diol becomes too high and thus inconvenience may be caused when using it in preparing the polyurethane.

In an embodiment, when the polycarbonate diol of the present invention further comprises repeated units derived from anhydrohexitol, the amount thereof may be, based on total 100% by weight of repeated units in the polycarbonate diol, 10 to 50% by weight, more concretely 10 to 30% by weight, still more concretely 14 to 29% by weight, and still more concretely 15 to 25% by weight. If the amount of the repeated units derived from anhydrohexitol in the polycarbonate diol is within the above range, the polyurethane prepared by using the polycarbonate diol of the present invention can show good scratch resistance and adhesion strength.

In an embodiment, the polycarbonate diol of the present invention may further comprise repeated units derived from aliphatic diol.

The aliphatic diol may be a linear or branched aliphatic diol having 2 to 10 carbons, more concretely a linear or branched aliphatic diol having 2 to 8 carbons, and still more concretely a linear or branched aliphatic diol having 2 to 6 carbons. In an embodiment, the aliphatic diol may be ethyleneglycol, propyleneglycol, 1,3-propanediol, 1,4-butanediol, 1,5-pentanediol, 1,6-hexanediol, 1,7-heptanediol, 1,8-octanediol, 1,9-nonanediol, 1,10-decanediol, diethyleneglycol, triethyleneglycol, tetraethyleneglycol, pentaethyleneglycol, 2-methyl-1,3-propanediol, 2-ethyl-1,3-propanediol, 2-butyl-1,3-propanediol, 2,2-dimethyl-1,3-propanediol, 2-ethyl-2-butyl-1,3-propanediol, 2,2-diethyl-1,3-propanediol, 3-methyl-1,5-pentanediol, 3,3-dimethyl-1,5-pentanediol, 2,2,4,4-tetramethyl-1,5-pentanediol, 2-ethyl-1,6-hexanediol, 1,3-cyclohexanediol, 1,4-cyclohexanediol, 1,4-cyclohexanedimethanol, 1,4-dihydroxyethylcyclohexane, norbornane-2,3-dimethanol or a combination thereof.

In an embodiment, when repeated units derived from aliphatic diol exist in the polycarbonate diol of the present invention, the amount thereof may be, based on total 100% by weight of repeated units in the polycarbonate diol, 0.1 to 35% by weight, more concretely 5 to 30% by weight, and still more concretely 15 to 25% by weight. In another embodiment, the amount of the repeated units derived from aliphatic diol in the polycarbonate diol of the present invention may be, based on total 100% by weight of repeated units in the polycarbonate diol, 0.1 to 30% by weight, more concretely 1 to 25% by weight, still more concretely 5 to 20% by weight, and still more concretely 5 to 10% by weight.

In an embodiment, the polycarbonate diol of the present invention may comprise repeated units having a structure of the following formula 1:

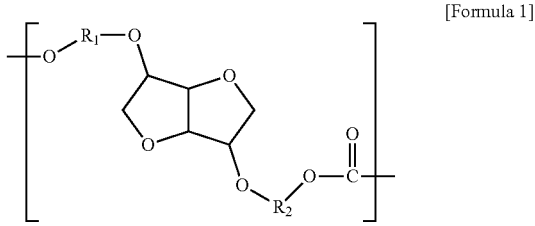

[Formula 1]

wherein each of $R_1$ and $R_2$ is independently a linear or branched alkylene group having 2 to 20 carbons (more concretely 2 to 10 carbons, still more concretely 2 to 8 carbons, and still more concretely 2 to 4 carbons), and $R_1$ and $R_2$ may be the same or different from each other.

In an embodiment, the repeated units having a structure of the above formula 1 may be derived from the reaction of ether diol of anhydrohexitol and carbonate diester.

In an embodiment, the polycarbonate diol of the present invention may further comprise repeated units having a structure of the following formula 2:

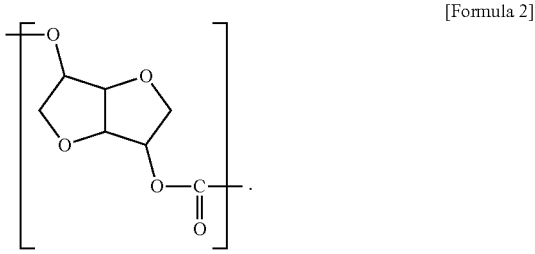

[Formula 2]

In an embodiment, the repeated units having a structure of the above formula 2 may be derived from the reaction of anhydrohexitol and carbonate diester.

In an embodiment, the polycarbonate diol of the present invention may further comprise repeated units having a structure of the following formula 3:

[Formula 3]

wherein $R_3$ is a linear or branched alkylene group having 2 to 10 carbons (more concretely 2 to 8 carbons, and still more concretely 2 to 6 carbons).

wherein $R_3$ is a linear or branched alkylene group having 2 to 10 carbons (more concretely 2 to 8 carbons, and still more concretely 2 to 6 carbons).

In an embodiment, the repeated units having a structure of the above formula 3 may be derived from the reaction of aliphatic diol and carbonate diester.

The number average molecular weight (Mn) of the polycarbonate diol of the present invention may be controlled according to the purpose of use, and, for example, its lower limit may be 250 or more, 500 or more, 600 or more, 700 or more, or 1,000 or more, and its upper limit may be 6,000 or less, 5,500 or less, 5,000 or less, 4,000 or less or 3,000 or less, and it may be preferably 600 to 5,500, but it is not limited thereto. If the number average molecular weight of the polycarbonate diol is too low, the hardness may not be sufficient and the adhesion strength may be lowered when preparing polyurethane, and if the number average molecular weight of the polycarbonate diol is too high, the handling may be difficult when preparing polyurethane, and the number average molecular weight of the polyurethane prepared by using it becomes too high so that it may be difficult to use as an adhesive.

Although the poly dispersity index (PDI) of the polycarbonate diol of the present invention is not especially limited, its lower limit may be 1.0 or more, 1.1 or more, or 1.2 or more, and its upper limit may be 3.0 or less, 2.5 or less, or 2.0 or less. If the poly dispersity index is greater than the above range, the properties of the polyurethane prepared by using the polycarbonate diol become worse so that it becomes hard at low temperature and the extension becomes bad. On the other hand, in order to prepare a polycarbonate diol with a poly dispersity index less than the above, a purification process of high degree for removal of oligomer, etc. may be required. The poly dispersity index is obtained as Weight average molecular weight (Mw)/Number average molecular weight (Mn), and conventionally it can be obtained by gel permeation chromatography (GPC) measurement.

The Gardner color index of the polycarbonate diol of the present invention may be 1 or less. The Gardner color index may be measured according to ASTM D 1544 by using a spectrocolormeter (for example, CM-5 of Konica Minolta) capable of measuring Gardner color index, and as the Gardner color index is low, it means close to colorless, and thus when polyurethane prepared by using the polycarbonate diol of the present invention is applied to a paint (particularly, waterborne paint), coating agent, adhesive and the like, their color becomes close to colorless, and so in application on an outside substrate, the problem in appearance due to color change can be resolved.

By using ether diol of anhydrohexitol, optionally anhydrohexitol and optionally aliphatic diol as diol components in preparing the polycarbonate diol of the present invention, as compared with conventional processes preparing polycarbonate diol by using anhydrohexitol only, the reaction temperature can be lowered, preparation in liquid form is possible, and the reaction can be reduced so that color change of the finally prepared polycarbonate diol can be prevented, thereby the Gardner color index can be maintained as 1 or less.

Although the amount of phenolic compounds as byproducts contained in the polycarbonate diol of the present invention is not especially limited, preferably it is contained as low as possible, and the residual amount of phenol in the polycarbonate diol of the present invention may be 50 ppm (the detection limit) or less.

In an embodiment, the state (liquid phase or solid phase) of the polycarbonate diol of the present invention may vary according to the amount of repeated units derived from anhydrohexitol Vs. the amount of repeated units derived from ether diol of anhydrohexitol (if repeated units derived from aliphatic diol is further comprised, the sum of amounts of repeated units derived from ether diol of anhydrohexitol and repeated units derived from aliphatic diol). As the amount of repeated units derived from anhydrohexitol becomes greater in comparison with the amount of repeated units derived from ether diol of anhydrohexitol (if repeated units derived from aliphatic diol is further comprised, the sum of amounts of repeated units derived from ether diol of anhydrohexitol and repeated units derived from aliphatic diol), it may become solid more easily, and as the above becomes smaller, it may become liquid more easily.

The polycarbonate diol of the present invention may be prepared by reacting a mixture comprising the above-explained ether diol of anhydrohexitol and carbonate diester, and optionally anhydrohexitol, in the presence of a transesterification catalyst, and at this time, optionally the mixture may further comprise aliphatic diol.

Therefore, another aspect of the present invention provides a method for preparing a polycarbonate diol, comprising a step of reacting a mixture comprising (i) ether diol of anhydrohexitol and (ii) carbonate diester, in the presence of a transesterification catalyst, and at this time, optionally the mixture may further comprise aliphatic diol.

In an embodiment, the mixture may further comprise (iii) anhydrohexitol.

The ether diol of anhydrohexitol, carbonate diester, anhydrohexitol and aliphatic diol useful in the method for preparing a polycarbonate diol of the present invention are the same as explained above.

In an embodiment, when the mixture does not comprise (iii) anhydrohexitol, the amount of ether diol of anhydrohexitol used in preparing the polycarbonate diol may be, based on total 100% by weight of the reactant mixture, 30 to 95% by weight, more concretely 40 to 90% by weight, still more concretely 50 to 85% by weight, and still more concretely 55 to 80% by weight. If the amount of ether diol of anhydrohexitol used is too less than the above level, although the hardness of polyurethane prepared by using the polycarbonate diol is improved, the temperature for preparation and use of the polyurethane becomes too high, and the flowability of the polyurethane decreases so that the handling may be difficult when preparing polyurethane. On the other hand, if the amount is too greater than the above level, the hardness of polyurethane prepared by using the polycarbonate diol is lowered and thus its scratch resistance may become poor, the flowability of the polyurethane becomes too high so that the handling may be difficult when preparing polyurethane by using it, and the viscosity of the polyurethane is also lowered and thus its adhesion strength may become poor.

In another embodiment, when the mixture further comprises (iii) anhydrohexitol, the amount of ether diol of anhydrohexitol used in preparing the polycarbonate diol may be, based on total 100% by weight of the reactant mixture, 5 to 60% by weight, more concretely 10 to 50% by weight, still more concretely 15 to 47% by weight, and still more concretely 25 to 46% by weight. If the amount of ether diol of anhydrohexitol used is too less than the above level, although the hardness of polyurethane prepared by using the polycarbonate diol is improved, the temperature for preparation and use of the polyurethane becomes too high, and the flowability of the polyurethane decreases so that the handling may be difficult when preparing polyurethane. On the other hand, if the amount is too greater than the above level, the hardness of polyurethane prepared by using the polycarbonate diol is lowered and thus its scratch resistance may become poor, and the viscosity of the polyurethane is also lowered and thus its adhesion strength may become poor.

In an embodiment, the amount of carbonate diester used in preparing the polycarbonate diol of the present invention may be, based on total 100% by weight of the reactant mixture, 5 to 70% by weight, more concretely 10 to 60% by weight, still more concretely 15 to 50% by weight, and still more concretely 20 to 45% by weight. In another embodiment, the amount of carbonate diester used may be, based on total 100% by weight of the reactant mixture, 25 to 60% by weight, more concretely 28 to 55% by weight, and still more concretely 30 to 50% by weight. If the amount of carbonate diester used is too less than the above level, the hardness of polyurethane prepared by using the polycarbonate diol may not be sufficient, and the adhesion strength may be lowered. On the other hand, if the amount is too greater than the above level, the number average molecular weight of the polycarbonate diol becomes too high and the viscosity becomes too high so that the handling may be difficult when preparing polyurethane by using it, and the number average molecular weight of the polyurethane also becomes too high so that it may be difficult to use as an adhesive.

In another embodiment, when the mixture further comprises (iii) anhydrohexitol, the amount of anhydrohexitol used in preparing the polycarbonate diol of the present invention may be, based on total 100% by weight of the reactant mixture, 10 to 45% by weight, more concretely 10 to 40% by weight, still more concretely 14 to 30% by weight, and still more concretely 15 to 25% by weight. If the amount of anhydrohexitol used is too less than the above level, the hardness of polyurethane prepared by using the polycarbonate diol becomes lowered and thus its scratch resistance may become poor, and the viscosity of the polyurethane is also lowered and thus its adhesion strength may become poor. On the other hand, if the amount is too greater than the above level, although the hardness of polyurethane prepared by using the polycarbonate diol is improved, the temperature for preparation and use of the polyurethane becomes too high, and the flowability of the polyurethane decreases so that the handling may be difficult when preparing polyurethane.

In another embodiment, when aliphatic diol is further used as an optional component in preparing the polycarbonate diol of the present invention, the amount of use thereof may be, based on total 100% by weight of the reactant mixture, 0.1 to 30% by weight, more concretely 0.5 to 25% by weight, still more concretely 1 to 20% by weight, still more concretely 5 to 18% by weight, and still more concretely 5 to 10% by weight. If the amount of aliphatic diol used is too greater than the above level, the hardness of polyurethane prepared by using the polycarbonate diol becomes lowered and thus its scratch resistance may become poor, and the viscosity of the polyurethane is also lowered and thus its adhesion strength may become poor.

As the transesterification catalyst, it is possible to use, without limitation, metal or a compound thereof such as hydroxide or salt, etc. which is regarded as having transesterification functionality generally.

Example of catalyst metal may be Group 1 metal such as lithium, sodium, potassium, rubidium, cesium, etc.; Group 2 metal such as magnesium, calcium, strontium, barium, etc.; Group 4 metal such as titanium, zirconium, etc.; Group 5 metal such as hafnium, etc.; Group 9 metal such as cobalt, etc.; Group 12 metal such as zinc, etc.; Group 13 metal such as aluminum, etc.; Group 14 metal such as germanium, tin, lead, etc.; Group 15 metal such as antimony, bismuth, etc.; and lanthanide metal such as lanthanum, cerium, europium, ytterbium, etc. Among them, in view of raising the transesterification reaction rate, Group 1 metal or Group 2 metal is preferred, and particularly Group 2 metal is more preferred.

Example of salt compound of the above catalyst metal may be halide salt such as chloride, bromide, iodide, etc.; carboxylate salt such as acetate, formate, benzoate, etc.; sulfonate salt such as methanesulfonate, toluenesulfonate, trifluoromethanesulfonate, etc.; phosphorus-containing salt such as phosphate, hydrogen phosphate, dihydrogen phosphate, etc.; and acetylacetonate salt, etc. The catalyst metal also may be used as alkoxide such as methoxide, ethoxide, etc.

The catalyst metal, hydroxide of catalyst metal and salt compound of catalyst metal may be used alone or in combination of two or more kinds.

In an embodiment, in case of using a compound comprising Group 1 metal as the transesterification catalyst, the example may be sodium hydroxide, potassium hydroxide; cesium hydroxide; lithium hydroxide; sodium hydrogen carbonate; sodium carbonate; potassium carbonate; cesium carbonate; lithium carbonate; sodium acetate; potassium acetate; cesium acetate; lithium acetate; sodium stearate; potassium stearate; cesium stearate; lithium stearate; sodium borohydride; sodium borophenylate; sodium benzoate; potassium benzoate; cesium benzoate; lithium benzoate; disodium hydrogen phosphate; dipotassium hydrogen phosphate; dilithium hydrogen phosphate; disodium phenyl phosphate; disodium salt, dipotassium salt, dicesium salt or dilithium salt of bisphenol A; sodium salt, potassium salt, cesium salt or lithium salt of phenol, etc.

In an embodiment, in case of using a compound comprising Group 2 metal as the transesterification catalyst, the example may be magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate or magnesium phenyl phosphate, etc.

In preparing the polycarbonate diol, the amount of use of the transesterification catalyst may be, as weight ratio of metal calculated to the weight of the raw material diol, 0.01 to 500 ppm, more concretely 0.1 to 100 ppm, and still more concretely 1 to 50 ppm, but it is not limited thereto.

In the reaction of mixture comprising ether diol of anhydrohexitol, carbonate diester, optionally anhydrohexitol, and optionally aliphatic diol in the method for preparing a polycarbonate diol of the present invention, although the reaction temperature is not especially limited, it may be conventionally 70° C. or higher, 100° C. or higher, or 130° C. or higher, and conventionally 250° C. or lower, 230° C. or lower, 200° C. or lower, 180° C. or lower, 170° C. or lower, or 165° C. or lower. The reaction may be conducted under atmospheric pressure or reduced pressure condition (for example, 10 kPa or lower, 5 kPa or lower, or 1 kPa or lower) conventionally for 1 to 50 hours, 1 to 20 hours, or 1 to 10 hours, but it is not limited thereto.

Another aspect of the present invention provides polyurethane comprising repeated units derived from the polycarbonate diol of the present invention and a method for preparing the same.

The method for preparing polyurethane of the present invention comprises the steps of: reacting a polyol component and a polyisocyanate component to prepare a prepolymer; and reacting the prepolymer with a chain extender; the method being characterized in that the polyol component comprises the polycarbonate diol of the present invention.

In addition to the polycarbonate diol of the present invention, if needed, the polyol component may further comprise other polyol. Example of such other polyol may be polyoxyalkyleneglycol such as polyethyleneglycol, polypropyleneglycol, polyoxytetramethyleneglycol (PTMG), etc.; alkyleneoxide adduct of polyalcohol such as ethyleneoxide adduct or propyleneoxide adduct of bisphenol A or glycerin, etc.; polyester polyol; polycaprolactone polyol; and polycarbonate polyol, etc.

Example of polyester polyol may be that obtained from dibasic acid such as adipic acid, phthalic acid, isophthalic acid, maleic acid, succinic acid, fumaric acid, etc. and glycol such as ethyleneglycol, diethyleneglycol, 1,3-propyleneglycol, 1,4-butanediol, 1,5-pentanediol, 1,6-hexanediol, trimethyolpropane, etc.; and example of polycarbonate polyol may be homo polycarbonate diol or copolymerized polycarbonate diol, etc. prepared from 1,4-butanediol, 1,5-pentanediol, 1,6-hexanediol, cyclohexanedimethanol or 2-methylpropandiol.

When the polyol component further comprises other polyol in addition to the polycarbonate diol of the present invention, the amount of the other polyol may be, based on total 100% by weight of the polyol component, less than 50% by weight (for example, 1 to 49% by weight), and more concretely less than 30% by weight (for example, 1 to 29% by weight), but it is not limited thereto.

The polyisocyanate component may be one or more aliphatic, alicyclic or aromatic polyisocyanate compounds, and the example may be aliphatic diisocyanate such as tetramethylene diisocyanate, hexamethylene diisocyanate, 2,2,4-trimethylhexamethylene diisocyanate, 2,4,4-trimethylhexamethylene diisocyanate, lysine diisocyanate and dimer diisocyanate wherein carboxylic group of dimeric acid is converted to isocyanate group, etc.; alicyclic diisocyanate such as 1,4-cyclohexane diisocyanate, isophorone diisocyanate, 1-methyl-2,4-cyclohexane diisocyanate, 1-methyl-2,6-cyclohexane diisocyanate, 4,4'-dicyclohexyl methane diisocyanate and 1,3-bis(isocyanatomethyl)cyclohexane, etc.; aromatic diisocyanate such as xylylene diisocyanate, 4,4'-diphenyl diisocyanate, 2,4-tolylene diisocyanate, 2,6-tolylene diisocyanate, m-phenylene diisocyanate, p-phenylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,5-naphthylene diisocyanate, 3,3'-dimethyl-4,4'-biphenylene diisocyanate, polymethylenepolyphenylisocyanate, phenylene diisocyanate and m-tetramethylxylylene diisocyanate, etc. It may be used alone, or two or more kinds may be used in combination.

In an embodiment, as the polyisocyanate component, 4,4'-diphenylmethane diisocyanate, hexamethylene diisocyanate, isophorone diisocyanate, or a combination thereof may be used.

The chain extender is a compound of a low molecular weight having at least two active hydrogens reacting the isocyanate group, and conventional polyol or polyamine may be used, and concrete example thereof may be diol having linear chain such as ethyleneglycol, diethyleneglycol, 1,3-propyleneglycol, 1,4-butanediol, 1,5-pentanediol, 1,6-hexanediol, 2,4-heptanediol, 1,8-octanediol, 1,4-dimethylolhexane, 1,9-nonanediol, 1,12-dodecanediol and dimer diol, etc.; diol having branched chain such as 2-methyl-1,3-propanediol, 2,2-dimethyl-1,3-propanediol, 2,2-diethyl-1,3-propanediol, 2-methyl-2-propyl-1,3-propanediol, 2-ethyl-1,3-hexanediol, 2,2,4-trimethyl-1,3-pentanediol, 2-methyl-1,8-octanediol, 2-butyl-2-ethyl-1,3-propanediol, etc.; diol having cyclic group such as 1,4-cyclohexanediol, 1,4-cyclohexanedimethanol, 1,4-dihydroxyethylcyclohexane, anhydrohexitol (for example, isosorbide, isomannide or isoidide), etc.; diol having aromatic group such as xylyleneglycol, 1,4-dihydroxyethylbenzene, 4,4'-methylenebis(hydroxyethylbenzene), etc,; polyol such as glycerine, trimethylolpropane, pentaerythritol, etc.; hydroxyamine such as N-methylethanolamine, N-ethylethanolamine, etc.; polyamine such as ethylenediamine, 1,3-diaminopropane, hexamethylenediamine, triethylenetetramine, diethylenetriamine, isophoronediamine, 4,4'-diaminodicyclohexylmethane, 2-hydroxyethylpropylenediamine, di-2-hydroxyethylethylenediamine, di-2-hydroxyethylpropylenediamine, 2-hydroxypropylethylenediamine, di-2-hydroxypropylethylenediamine, 4,4'-diphenylmethanediamine, methylenebis(o-chloroaniline), xylylenediamine, diphenyldiamine, tolylenediamine, hydrazine, piperazine, and N,N'-diaminopiperazine, etc. The chain extender may be used alone, or in combination of two or more kinds.

In an embodiment, as the chain extender, 1,4-butanediol, 1,5-pentanediol, 1,6-hexanediol, 1,8-octanediol, 1,9-nonanediol, 1,4-cyclohexanedimethanol, 1,4-dihydroxyethylcyclohexane, anhydrohexitol (for example, isosorbide, isomannide or isoidide), ethylenediamine, 1,3-diaminopropane or a combination thereof may be used.

In the reaction of polyol component and polyisocyanate component, the amount of polyisocyanate used is not expecially limited, and the polyisocyanate may be used in an amount corresponding to 1 to 10 equivalents (more concretely 1 to 5 equivalents, and still more concretely 1 to 3 equivalents) of isocyanate group to 1 equivalent of the hydroxy group in the polyol component.

In the reaction of prepolymer and chain extender, the amount of chain extender used is not expecially limited, and the chain extender may be used in an amount corresponding to 0.1 to 5 equivalents (more concretely 0.5 to 3 equivalents, and still more concretely 0.8 to 2 equivalents) of hydroxy group or amine group to 1 equivalent of the isocyanate group in the prepolymer.

There is no special limitation to the methods and conditions for the reaction of polyol component and polyisocyanate component and the reaction of prepolymer and chain extender, and conventional methods and conditions may be used as they are or with proper modification.

Since the polycarbonate diol of the present invention is prepared by using ether diol of anhydrohexitol or using ether diol of anhydrohexitol and anhydrohexitol together, the reactivity is improved and thus the color change of the polycarbonate diol can be prevented. In addition, the polyurethane adhesive prepared by using the polycarbonate diol of the present invention shows improved T-peel strength or shear strength and thus the adhesion strength is improved.

Therefore, another aspect of the present invention provides an adhesive (particularly, adhesive for structure, adhesive for shoes, or hot melt adhesive) comprising the polyurethane of the present invention.

The polyurethane adhesive of the present invention can be usefully applied to food package, leather shoes, shoes, magnetic tape binder, tissue paper, wood, structural member, etc.

Another aspect of the present invention provides a paint (particularly, waterborne paint) or a coating agent comprising the polyurethane of the present invention.

Since the polyurethane paint or polyurethane coating agent of the present invention is nearly colorless, even in case of applying it to outside of a substrate, bad feeling to the appearance due to color change can be prevented.

The present invention is explained in more detail through the following Examples and Comparative Examples. However, the scope of the present invention is not limited thereby in any manner.

EXAMPLES

Preparation of Ether Diol of Anhydrohexitol

Preparation Example 1: Preparation of Ether Diol of Anhydrohexitol by Using Ethylene Oxide 1,460 g of isosorbide and 3.0 g of potassium hydroxide were put into a reactor that could be pressurized and heated, and the inside of the reactor was substituted with nitrogen and heated up to 100° C. and the moisture in the reactor was removed by pressure reduction under vacuum. Then, while adding 2,200 g of ethylene oxide slowly thereto, the reaction was conducted at 100 to 140° C. for 5 to 6 hours. At that time, the reaction temperature was controlled so as not to exceed 140° C. After completing the reaction, the resulting mixture was cooled to 50° C., 40 g of AMBOSOL MP20 as added thereto, and the mixture was reheated and agitated at 100° C. to 120° C. for 1 to 5 hours to remove residual metal ions (at that time, nitrogen was fed or pressure reduction under vacuum was carried out). After confirming that no metal ions were detected, the mixture was cooled to 60° C. to 90° C. and the remaining byproduct was removed through a filter to obtain 3,500 g of isosorbide ether diol (ethylene oxide 5 mole adduct of isosorbide) in transparent liquid form having the following structure.

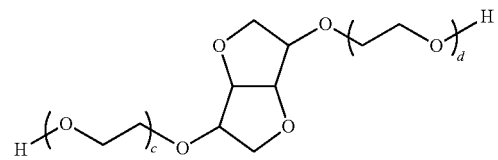

wherein each of c and d is independently an integer of 1 to 4, and c+d is 5.

Preparation Example 2: Preparation of Ether Diol of Anhydrohexitol by Using Propylene Oxide Excepting that 2,900 g of propylene oxide was used instead of ethylene oxide, the same method as Preparation Example 1 was conducted to obtain 4,200 g of isosorbide ether diol (propylene oxide 5 mole adduct of isosorbide) in transparent liquid form having the following structure.

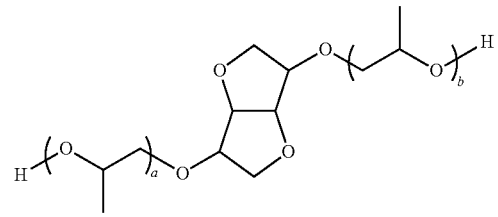

wherein each of a and b is independently an integer of 1 to 4, and a+b is 5.

Preparation Example 3: Preparation of Ether Diol of Anhydrohexitol by Using Ethylene Carbonate 1,460 g of isosorbide, 2,639 g of ethylene carbonate and 166 g of potassium carbonate as catalyst were put into a reactor that could be heated and refluxed and ventilated for carbon dioxide gas, and while heating the mixture at 150° C. to 180° C., the reaction was conducted for 8 to 10 hours. Then, the resulting mixture was cooled and the catalyst and byproduct were filtered, and vacuum evaporation was conducted to remove unreacted ethylene carbonate to obtain 1,470 g of isosorbide ether diol having the following structure.

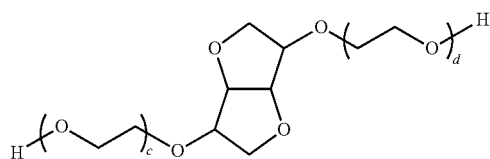

wherein each of c and d is independently an integer of 1 to 4, and c+d is 5.

Preparation of Polycarbonate Diol by Using the Prepared Ether Diol of Anhydrohexitol Example 1-A1: Preparation of Liquid Polycarbonate Diol by Using Isosorbide Ether Diol of Preparation Example 1 and Carbonate Diester Into a 5-necked flask connected to nitrogen gas line and vacuum pump for pressure reduction equipped with trap for byproduct removal and having agitator, thermometer and heater, 500 g of isosorbide ether diol prepared in Preparation Example 1 and 117.5 g of diphenyl carbonate were fed, and heated up to 100° C. under nitrogen atmosphere, and then after confirming that the reactant materials were melted, 5.0 mg of magnesium acetate tetrahydrate was added and agitation was started. The nitrogen atmosphere was maintained until the reaction temperature reached 120° C., and thereafter, the reaction system was heated up to 155° C. while maintaining it as a closed system (at that time, attention was paid since continuous maintenance of nitrogen atmosphere would cause sublimation of the reactant materials, resulting in ratio change and failure to obtain desired molecular weight). After arriving at the predetermined temperature, while maintaining it for 1 hour, the reaction was conducted, and after confirming that the phenol as byproduct was refluxed through the reactor wall, the pressure was reduced to 100 Torr to 120 Torr within 30 minutes by using the vacuum pump, and while removing the generated phenol, the reaction was conducted for 1 to 2 hours. When the amount of phenol generated came up to 70 to 80% of the theoretical generation amount, the pressure was reduced to 5 Torr to 10 Torr, and the reaction was further conducted for 1 to 2 hours. Then, when about 95% of phenol was removed, the reaction product was bubbled with nitrogen for 1 to 2 hours while maintaining the reduced pressure condition to completely remove residual phenol, through which about 498 g of poly carbonate diol was obtained.

The obtained polycarbonate diol was a transparent liquid with Gardner color index of 1 or less and hydroxyl value of 185.9. The number average molecular weight calculated from the hydroxyl value was 603.5 g/mol, the measured PDI was 1.64, and the residual phenol amount was below the detection limit 50 ppm.

Example 1-A2: Preparation of Liquid Polycarbonate Diol by Using Isosorbide Ether Diol of Preparation Example 1 and Carbonate Diester Excepting that the amount of diphenyl carbonate was changed from 117.5 g to 238 g, the same method as Example 1-A1 was conducted to obtain about 625 g of polycarbonate diol.

The obtained polycarbonate diol was a transparent liquid with Gardner color index of 1 or less and hydroxyl value of 56.2. The number average molecular weight calculated from the hydroxyl value was 1,997.5, the measured PDI was 1.25, and the residual phenol amount was below the detection limit 50 ppm.

Example 1-A3: Preparation of Liquid Polycarbonate Diol by Using Isosorbide Ether Diol of Preparation Example 1 and Carbonate Diester Excepting that the amount of diphenyl carbonate was changed from 117.5 g to 271.5 g, the same method as Example 1-A1 was conducted to obtain about 630 g of polycarbonate diol.

The obtained polycarbonate diol was a transparent liquid with Gardner color index of 1 or less and hydroxyl value of 22.6. The number average molecular weight calculated from the hydroxyl value was 4,956.4, the measured PDI was 1.54, and the residual phenol amount was below the detection limit 50 ppm.

Example 1-A4: Preparation of Liquid Polycarbonate Diol by Using Isosorbide Ether Diol of Preparation Example 1, Aliphatic Diol and Carbonate Diester Excepting that the amount of diphenyl carbonate was changed from 117.5 g to 256 g and 162 g of 1,6-hexanediol was additionally used, the same method as Example 1-A1 was conducted to obtain about 611 g of polycarbonate diol.

The obtained polycarbonate diol was a transparent liquid with Gardner color index of 1 or less and hydroxyl value of 56.0. The number average molecular weight calculated from the hydroxyl value was 2,004.5, the measured PDI was 1.35, and the residual phenol amount was below the detection limit 50 ppm.

Example 1-A5: Preparation of liquid polycarbonate diol by using isosorbide ether diol of Preparation Example 1, aliphatic diol and carbonate diester Excepting that the amount of diphenyl carbonate was changed from 117.5 g to 247 g and 69.5 g of 1,6-hexanediol was additionally used, the same method as Example 1-A1 was conducted to obtain about 605 g of polycarbonate diol.

The obtained polycarbonate diol was a transparent liquid with Gardner color index of 1 or less and hydroxyl value of 56.4. The number average molecular weight calculated from the hydroxyl value was 1,989.9, the measured PDI was 1.49, and the residual phenol amount was below the detection limit 50 ppm.

Example 1-A6: Preparation of Liquid Polycarbonate Diol by Using Isosorbide Ether Diol of Preparation Example 2 and Carbonate Diester Excepting that 500 g of isosorbide ether diol prepared in Preparation Example 2 was used instead of isosorbide ether diol prepared in Preparation Example 1 and the amount of diphenyl carbonate was changed from 117.5 g to 70 g, the same method as Example 1-A1 was conducted to obtain about 423 g of polycarbonate diol.

The obtained polycarbonate diol was a transparent liquid with Gardner color index of 1 or less and hydroxyl value of 180.6. The number average molecular weight calculated from the hydroxyl value was 621.1, the measured PDI was 1.66, and the residual phenol amount was below the detection limit 50 ppm.

Example 1-A7: Preparation of Liquid Polycarbonate Diol by Using Isosorbide Ether Diol of Preparation Example 2 and Carbonate Diester Excepting that 500 g of isosorbide ether diol prepared in Preparation Example 2 was used instead of isosorbide ether diol prepared in Preparation Example 1 and the amount of diphenyl carbonate was changed from 117.5 g to 194 g, the same method as Example 1-A1 was conducted to obtain about 554 g of polycarbonate diol.

The obtained polycarbonate diol was a transparent liquid with Gardner color index of 1 or less and hydroxyl value of 56.2. The number average molecular weight calculated from the hydroxyl value was 1,996.5, the measured PDI was 1.44, and the residual phenol amount was below the detection limit 50 ppm.

Example 1-A8: Preparation of Liquid Polycarbonate Diol by Using Isosorbide Ether Diol of Preparation Example 2 and Carbonate Diester Excepting that 500 g of isosorbide ether diol prepared in Preparation Example 2 was used instead of isosorbide ether diol prepared in Preparation Example 1 and the amount of diphenyl carbonate was changed from 117.5 g to 226 g, the same method as Example 1-A1 was conducted to obtain about 588 g of polycarbonate diol.

The obtained polycarbonate diol was a transparent liquid with Gardner color index of 1 or less and hydroxyl value of 22.2. The number average molecular weight calculated from the hydroxyl value was 5,054.1, the measured PDI was 1.58, and the residual phenol amount was below the detection limit 50 ppm.

Example 1-A9: Preparation of Liquid Polycarbonate Diol by Using Isosorbide Ether Diol of Preparation Example 2, Aliphatic Diol and Carbonate Diester Excepting that 500 g of isosorbide ether diol prepared in Preparation Example 2 was used instead of isosorbide ether diol prepared in Preparation Example 1, the amount of diphenyl carbonate was changed from 117.5 g to 211 g and 137 g of 1,6-hexanediol was additionally used, the same method as Example 1-A1 was conducted to obtain about 576 g of polycarbonate diol.

The obtained polycarbonate diol was a transparent liquid with Gardner color index of 1 or less and hydroxyl value of 184.4. The number average molecular weight calculated from the hydroxyl value was 608.4, the measured PDI was 1.65, and the residual phenol amount was below the detection limit 50 ppm.

Example 1-A10: Preparation of Liquid Polycarbonate Diol by Using Isosorbide Ether Diol of Preparation Example 2, Aliphatic Diol and Carbonate Diester Excepting that 500 g of isosorbide ether diol prepared in Preparation Example 2 was used instead of isosorbide ether diol prepared in Preparation Example 1, the amount of diphenyl carbonate was changed from 117.5 g to 204 g and 59 g of 1,6-hexanediol was additionally used, the same method as Example 1-A1 was conducted to obtain about 580 g of polycarbonate diol.

The obtained polycarbonate diol was a transparent liquid with Gardner color index of 1 or less and hydroxyl value of 22.3. The number average molecular weight calculated from the hydroxyl value was 5,023.2, the measured PDI was 1.72, and the residual phenol amount was below the detection limit 50 ppm.

Example 1-A11: Preparation of Liquid Polycarbonate Diol by Using Isosorbide Ether Diol of Preparation Example 3 and Carbonate Diester Excepting that 500 g of isosorbide ether diol prepared in Preparation Example 3 was used instead of isosorbide ether diol prepared in Preparation Example 1, the same method as Example 1-A1 was conducted to obtain about 491 g of polycarbonate diol.

The obtained polycarbonate diol was a transparent liquid with Gardner color index of 1 or less and hydroxyl value of 187.5. The number average molecular weight calculated from the hydroxyl value was 598.4, the measured PDI was 1.46, and the residual phenol amount was below the detection limit 50 ppm.

Example 1-A12: Preparation of Liquid Polycarbonate Diol by Using Isosorbide Ether Diol of Preparation Example 3 and Carbonate Diester Excepting that 500 g of isosorbide ether diol prepared in Preparation Example 3 was used instead of isosorbide ether diol prepared in Preparation Example 1 and the amount of diphenyl carbonate was changed from 117.5 g to 238 g, the same method as Example 1-A1 was conducted to obtain about 604 g of polycarbonate diol.

The obtained polycarbonate diol was a transparent liquid with Gardner color index of 1 or less and hydroxyl value of 55.7. The number average molecular weight calculated from the hydroxyl value was 2,015.6, the measured PDI was 1.35, and the residual phenol amount was below the detection limit 50 ppm.

Example 1-A13: Preparation of Liquid Polycarbonate Diol by Using Isosorbide Ether Diol of Preparation Example 3 and Carbonate Diester Excepting that 500 g of isosorbide ether diol prepared in Preparation Example 3 was used instead of isosorbide ether diol prepared in Preparation Example 1 and the amount of diphenyl carbonate was changed from 117.5 g to 271.5 g, the same method as Example 1-A1 was conducted to obtain about 651 g of polycarbonate diol.

The obtained polycarbonate diol was a transparent liquid with Gardner color index of 1 or less and hydroxyl value of 22.2. The number average molecular weight calculated from the hydroxyl value was 5,047.6, the measured PDI was 1.25, and the residual phenol amount was below the detection limit 50 ppm.

Example 1-A14: Preparation of Liquid Polycarbonate Diol by Using Isosorbide Ether Diol of Preparation Example 3, Aliphatic Diol and Carbonate Diester Excepting that 500 g of isosorbide ether diol prepared in Preparation Example 3 was used instead of isosorbide ether diol prepared in Preparation Example 1, the amount of diphenyl carbonate was changed from 117.5 g to 256 g and 162 g of 1,6-hexanediol was additionally used, the same method as Example 1-A1 was conducted to obtain about 630 g of polycarbonate diol.

The obtained polycarbonate diol was a transparent liquid with Gardner color index of 1 or less and hydroxyl value of 53.9. The number average molecular weight calculated from the hydroxyl value was 2,080.6, the measured PDI was 1.84, and the residual phenol amount was below the detection limit 50 ppm.

Example 1-A15: Preparation of Liquid Polycarbonate Diol by Using Isosorbide Ether Diol of Preparation Example 3, Aliphatic Diol and Carbonate Diester Excepting that 500 g of isosorbide ether diol prepared in Preparation Example 3 was used instead of isosorbide ether diol prepared in Preparation Example 1, the amount of diphenyl carbonate was changed from 117.5 g to 247 g and 69.5 g of 1,6-hexanediol was additionally used, the same method as Example 1-A1 was conducted to obtain about 627 g of polycarbonate diol.

The obtained polycarbonate diol was a transparent liquid with Gardner color index of 1 or less and hydroxyl value of 54.8. The number average molecular weight calculated from the hydroxyl value was 2,047.6, the measured PDI was 1.84, and the residual phenol amount was below the detection limit 50 ppm.

Example 2-A1: Preparation of liquid polycarbonate diol by using isosorbide, isosorbide ether diol of Preparation Example 1 and carbonate diester Into a 5-necked flask connected to nitrogen gas line and vacuum pump for pressure reduction equipped with trap for byproduct removal and having agitator, thermometer and heater, 150 g of isosorbide, 374 g of isosorbide ether diol prepared in Preparation Example 1 and 347.5 g of diphenyl carbonate were fed, and heated up to 100° C. under nitrogen atmosphere, and then after confirming that the reactant materials were melted, 5.0 mg of magnesium acetate tetrahydrate was added and agitation was started. The nitrogen atmosphere was maintained until the reaction temperature reached 120° C., and thereafter, the reaction system was heated up to 155° C. while maintaining it as a closed system (at that time, attention was paid since continuous maintenance of nitrogen atmosphere would cause sublimation of the reactant materials, resulting in ratio change and failure to obtain desired molecular weight). After arriving at the predetermined temperature, while maintaining it for 1 hour, the reaction was conducted, and after confirming that the phenol as byproduct was refluxed through the reactor wall, the pressure was reduced to 100 Torr to 120 Torr within 30 minutes by using the vacuum pump, and while removing the generated phenol, the reaction was conducted for 1 to 2 hours. When the amount of phenol generated came up to 70 to 80% of the theoretical generation amount, the pressure was reduced to 5 Torr to 10 Torr, and the reaction was further conducted for 1 to 2 hours. Then, when about 95% of phenol was removed, the reaction product was bubbled with nitrogen for 1 to 2 hours while maintaining the reduced pressure condition to completely remove residual phenol, through which about 550 g of polycarbonate diol was obtained.

The obtained polycarbonate diol was a transparent liquid with Gardner color index of 1 or less and hydroxyl value of 104.0. The number average molecular weight calculated from the hydroxyl value was 1,079.3, the measured PDI was 1.58, and the residual phenol amount was below the detection limit 50 ppm.

Example 2-A2: Preparation of Solid Polycarbonate Diol by Using Isosorbide, Isosorbide Ether Diol of Preparation Example 1 and Carbonate Diester Excepting that the amount of isosorbide ether diol prepared in Preparation Example 1 was changed from 374 g to 161 g and the amount of diphenyl carbonate was changed from 347.5 g to 277 g, the same method as Example 2-A1 was conducted to obtain about 338 g of polycarbonate diol.

The obtained polycarbonate diol was a transparent solid with Gardner color index of 1 or less and hydroxyl value of 54.1. The number average molecular weight calculated from the hydroxyl value was 2,073.9, the measured PDI was 1.17, and the residual phenol amount was below the detection limit 50 ppm.

Example 2-A3: Preparation of Liquid Polycarbonate Diol by Using Isosorbide, Isosorbide Ether Diol of Preparation Example 1, Aliphatic Diol and Carbonate Diester Excepting that the amount of isosorbide ether diol prepared in Preparation Example 1 was changed from 374 g to 249 g, the amount of isosorbide was changed from 150 g to 100 g, the amount of diphenyl carbonate was changed from 347.5 g to 322.5 g and 40.5 g of 1,6-hexanediol was additionally used, the same method as Example 2-A1 was conducted to obtain about 410 g of polycarbonate diol.

The obtained polycarbonate diol was a transparent liquid with Gardner color index of 1 or less and hydroxyl value of 53.2. The number average molecular weight calculated from the hydroxyl value was 2,109.0, the measured PDI was 1.89, and the residual phenol amount was below the detection limit 50 ppm.

Example 2-A4: Preparation of Solid Polycarbonate Diol by Using Isosorbide, Isosorbide Ether Diol of Preparation Example 1, Aliphatic Diol And Carbonate Diester Excepting that the amount of isosorbide ether diol prepared in Preparation Example 1 was changed from 374 g to 415.5 g, the amount of isosorbide was changed from 150 g to 500 g, the amount of diphenyl carbonate was changed from 347.5 g to 855 g and 135 g of 1,6-hexanediol was additionally used, the same method as Example 2-A1 was conducted to obtain about 1,134 g of polycarbonate diol.

The obtained polycarbonate diol was a transparent solid with Gardner color index of 1 or less and hydroxyl value of 165.5. The number average molecular weight calculated from the hydroxyl value was 677.9, the measured PDI was 1.24, and the residual phenol amount was below the detection limit 50 ppm.

Example 2-A5: Preparation of Liquid Polycarbonate Diol by Using Isosorbide, Isosorbide Ether Diol of Preparation Example 1, Aliphatic Diol and Carbonate Diester Excepting that the amount of isosorbide ether diol prepared in Preparation Example 1 was changed from 374 g to 356 g, the amount of isosorbide was changed from 150 g to 500 g, the amount of diphenyl carbonate was changed from 347.5 g to 933.5 g and 16.5 g of 1,6-hexanediol was additionally used, the same method as Example 2-A1 was conducted to obtain about 978.2 g of polycarbonate diol.

The obtained polycarbonate diol was a transparent liquid with Gardner color index of 1 or less and hydroxyl value of 21.9. The number average molecular weight calculated from the hydroxyl value was 5,123.3, the measured PDI was 1.36, and the residual phenol amount was below the detection limit 50 ppm.

Example 2-A6: Preparation of Liquid Polycarbonate Diol by Using Isosorbide, Isosorbide Ether Diol of Preparation Example 2 and Carbonate Diester Excepting that 442 g of isosorbide ether diol prepared in Preparation Example 2 was used instead of isosorbide ether diol prepared in Preparation Example 1, the same method as Example 2-A1 was conducted to obtain about 628.4 g of polycarbonate diol.

The obtained polycarbonate diol was a transparent liquid with Gardner color index of 1 or less and hydroxyl value of 101.7. The number average molecular weight calculated from the hydroxyl value was 1,103.3, the measured PDI was 1.94, and the residual phenol amount was below the detection limit 50 ppm.

Example 2-A7: Preparation of Solid Polycarbonate Diol by Using Isosorbide, Isosorbide Ether Diol of Preparation Example 2 and Carbonate Diester Excepting that 190 g of isosorbide ether diol prepared in Preparation Example 2 was used instead of isosorbide ether diol prepared in Preparation Example 1 and the amount of diphenyl carbonate was changed from 347.5 g to 277 g, the same method as Example 2-A1 was conducted to obtain about 350.6 g of polycarbonate diol.

The obtained polycarbonate diol was a transparent solid with Gardner color index of 1 or less and hydroxyl value of 56.2. The number average molecular weight calculated from the hydroxyl value was 1,996.5, the measured PDI was 1.85, and the residual phenol amount was below the detection limit 50 ppm.

Example 2-A8: Preparation of Liquid Polycarbonate Diol by Using Isosorbide, Isosorbide Ether Diol of Preparation Example 2, Aliphatic Diol And Carbonate Diester Excepting that 295 g of isosorbide ether diol prepared in Preparation Example 2 was used instead of isosorbide ether diol prepared in Preparation Example 1, the amount of isosorbide was changed from 150 g to 100 g, the amount of diphenyl carbonate was changed from 347.5 g to 319 g and 40.5 g of 1,6-hexanediol was additionally used, the same method as Example 2-A1 was conducted to obtain about 452.6 g of polycarbonate diol.

The obtained polycarbonate diol was a transparent liquid with Gardner color index of 1 or less and hydroxyl value of 53.8. The number average molecular weight calculated from the hydroxyl value was 2,085.6, the measured PDI was 1.44, and the residual phenol amount was below the detection limit 50 ppm.

Example 2-A9: Preparation of Solid Polycarbonate Diol by Using Isosorbide, Isosorbide Ether Diol of Preparation Example 2, Aliphatic Diol and Carbonate Diester Excepting that 491.5 g of isosorbide ether diol prepared in Preparation Example 2 was used instead of isosorbide ether diol prepared in Preparation Example 1, the amount of isosorbide was changed from 150 g to 500 g, the amount of diphenyl carbonate was changed from 347.5 g to 794 g and 135 g of 1,6-hexanediol was additionally used, the same method as Example 2-A1 was conducted to obtain about 1,205.4 g of polycarbonate diol.

The obtained polycarbonate diol was a transparent solid with Gardner color index of 1 or less and hydroxyl value of 184.4. The number average molecular weight calculated from the hydroxyl value was 608.4, the measured PDI was 1.67, and the residual phenol amount was below the detection limit 50 ppm.

Example 2-A10: Preparation of Liquid Polycarbonate Diol By Using Isosorbide, Isosorbide Ether Diol of Preparation Example 2, Aliphatic Diol and Carbonate Diester Excepting that 421 g of isosorbide ether diol prepared in Preparation Example 2 was used instead of isosorbide ether diol prepared in Preparation Example 1, the amount of isosorbide was changed from 150 g to 500 g, the amount of diphenyl carbonate was changed from 347.5 g to 923.5 g and 16.5 g of 1,6-hexanediol was additionally used, the same method as Example 2-A1 was conducted to obtain about 968.3 g of polycarbonate diol.

The obtained polycarbonate diol was a transparent liquid with Gardner color index of 1 or less and hydroxyl value of 22.3. The number average molecular weight calculated from the hydroxyl value was 5,023.2, the measured PDI was 1.85, and the residual phenol amount was below the detection limit 50 ppm.

Example 2-A11: Preparation of Liquid Polycarbonate Diol by Using Isosorbide, Isosorbide Ether Diol of Preparation Example 3 and Carbonate Diester Excepting that 374 g of isosorbide ether diol prepared in Preparation Example 3 was used instead of isosorbide ether diol prepared in Preparation Example 1, the same method as Example 2-A1 was conducted to obtain about 546 g of polycarbonate diol.

The obtained polycarbonate diol was a transparent liquid with Gardner color index of 1 or less and hydroxyl value of 104.8. The number average molecular weight calculated from the hydroxyl value was 1,070.2, the measured PDI was 1.64, and the residual phenol amount was below the detection limit 50 ppm.

Example 2-A12: Preparation of Solid Polycarbonate Diol By Using Isosorbide, Isosorbide Ether Diol of Preparation Example 3 and Carbonate Diester Excepting that 161 g of isosorbide ether diol prepared in Preparation Example 3 was used instead of isosorbide ether diol prepared in Preparation Example 1, the same method as Example 2-A1 was conducted to obtain about 331 g of polycarbonate diol.

The obtained polycarbonate diol was a transparent solid with Gardner color index of 1 or less and hydroxyl value of 55.5. The number average molecular weight calculated from the hydroxyl value was 2,020.5, the measured PDI was 1.85, and the residual phenol amount was below the detection limit 50 ppm.

Example 2-A13: Preparation of Liquid Polycarbonate Diol by Using Isosorbide, Isosorbide Ether Diol of Preparation Example 3, Aliphatic Diol and Carbonate Diester Excepting that 249 g of isosorbide ether diol prepared in Preparation Example 3 was used instead of isosorbide ether diol prepared in Preparation Example 1, the amount of isosorbide was changed from 150 g to 100 g, the amount of diphenyl carbonate was changed from 347.5 g to 322.5 g and 40.5 g of 1,6-hexanediol was additionally used, the same method as Example 2-A1 was conducted to obtain about 409.7 g of polycarbonate diol.

The obtained polycarbonate diol was a transparent liquid with Gardner color index of 1 or less and hydroxyl value of 56.2. The number average molecular weight calculated from the hydroxyl value was 1,995.8, the measured PDI was 1.62, and the residual phenol amount was below the detection limit 50 ppm.

Example 2-A14: Preparation of Solid Polycarbonate Diol by Using Isosorbide, Isosorbide Ether diol of Preparation Example 3, Aliphatic Diol and Carbonate Diester Excepting that 415.5 g of isosorbide ether diol prepared in Preparation Example 3 was used instead of isosorbide ether diol prepared in Preparation Example 1, the amount of isosorbide was changed from 150 g to 500 g, the amount of diphenyl carbonate was changed from 347.5 g to 855 g and 135 g of 1,6-hexanediol was additionally used, the same method as Example 2-A1 was conducted to obtain about 1,130.5 g of polycarbonate diol.

The obtained polycarbonate diol was a transparent solid with Gardner color index of 1 or less and hydroxyl value of 193.3. The number average molecular weight calculated from the hydroxyl value was 580.4, the measured PDI was 1.24, and the residual phenol amount was below the detection limit 50 ppm.

Example 2-A15: Preparation of Liquid Polycarbonate Diol by Using Isosorbide, Isosorbide Ether Diol of Preparation Example 3, Aliphatic Diol and Carbonate Diester Excepting that 356 g of isosorbide ether diol prepared in Preparation Example 3 was used instead of isosorbide ether diol prepared in Preparation Example 1, the amount of isosorbide was changed from 150 g to 500 g, the amount of diphenyl carbonate was changed from 347.5 g to 933.5 g and 16.5 g of 1,6-hexanediol was additionally used, the same method as Example 2-A1 was conducted to obtain about 970.4 g of polycarbonate diol.

The obtained polycarbonate diol was a transparent liquid with Gardner color index of 1 or less and hydroxyl value of 22.5. The number average molecular weight calculated from the hydroxyl value was 4,980.6, the measured PDI was 1.42, and the residual phenol amount was below the detection limit 50 ppm.

Comparative Example A1: Preparation of liquid polycarbonate diol by using aliphatic diol and carbonate diester Excepting that 500 g of 1,6-hexanediol was used instead of isosorbide ether diol prepared in Preparation Example 1 and the amount of diphenyl carbonate was changed from 117.5 g to 843 g, the same method as Example 1-A1 was conducted to obtain about 716 g of polycarbonate diol.

The obtained polycarbonate diol was a transparent liquid with Gardner color index of 3 and hydroxyl value of 55.5. The number average molecular weight calculated from the hydroxyl value was 2,020.5, the measured PDI was 1.64, and the residual phenol amount was below the detection limit 50 ppm.

Comparative Example A2: Preparation of solid polycarbonate diol by using isosorbide and carbonate diester Excepting that 300 g of isosorbide was used instead of isosorbide ether diol prepared in Preparation Example 1 and the amount of diphenyl carbonate was changed from 117.5 g to 403 g, the same method as Example 1-A1 was conducted to obtain about 332 g of polycarbonate diol.

The obtained polycarbonate diol was a transparent solid with Gardner color index of 2 and hydroxyl value of 51.2. The number average molecular weight calculated from the hydroxyl value was 2,190.1, the measured PDI was 1.65, and the residual phenol amount was below the detection limit 50 ppm.

Comparative Example A3: Preparation of Solid Polycarbonate Diol by Using Isosorbide, Aliphatic Diol And Carbonate Diester Excepting that 250 g of isosorbide and 202 g of 1,6-hexanediol were used instead of isosorbide ether diol prepared in Preparation Example 1 and the amount of diphenyl carbonate was changed from 117.5 g to 579 g, the same method as Example 1-A1 was conducted to obtain about 509 g of polycarbonate diol.

The obtained polycarbonate diol was a transparent solid with Gardner color index of 3 and hydroxyl value of 53.5. The number average molecular weight calculated from the hydroxyl value was 2,097.2, the measured PDI was 1.45, and the residual phenol amount was below the detection limit 50 ppm.

Comparative Example A4: Preparation of Liquid Polycarbonate Diol by Using Aliphatic Diol And Carbonate Diester Excepting that isosorbide and isosorbide ether diol prepared in Preparation Example 1 were not used, 404 g of 1,6-hexanediol was used instead and the amount of diphenyl carbonate was changed from 347.5 g to 579 g, the same method as Example 2-A1 was conducted to obtain about 470.1 g of polycarbonate diol.

The obtained polycarbonate diol was a transparent liquid with Gardner color index of 3 or more and hydroxyl value of 52.7. The number average molecular weight calculated from the hydroxyl value was 2,129.0, the measured PDI was 1.87, and the residual phenol amount was below the detection limit 50 ppm.

Measurement for Property Of Polycarbonate Diol

1. Method for Measuring Hydroxyl Value

Hydroxyl value of each polycarbonate diol prepared in Examples 1-A1 to 2-A15 and Comparative Examples A1 to A4 was measured according to ASTM D-4274 D. The concrete procedures for measurement are as follows:

1) Reagent Preparation

| | |
|---|---|
| 1.95N Phthalic anhydride reagent | 145 g of phthalic anhydride was weighed and put into a 1L flask and 900 ml of pyridine was added and agitated for dissolution. After the reagent preparation, the blank test was set for 96 ml or more of 0.5N NaOH. |
| 1.6M Imidazole reagent | In a 500 ml flask, 56 g of imidazole was dissolved in 400 ml of pyridine. |
| 1% Phenolphthalein reagent | 1 g of phenolphthalein was dissolved in 100 ml of pyridine. |
| 0.5N NaOH for titration | 4 g of potassium phthalate (KHP) was weighed and put into each of two 250 ml beakers and dissolved in 150 ml of distilled water, and then phenolphthalein solution was added thereto and titrated by using a 50 ml burette until the color changed to pink. |

$$Nomality = \frac{KHP(g)}{0.20423 \times NaOH(ml)}$$

The mean value of the measured two normality values was used but recalibrated with 15-day interval.

2) Test Procedure

In a 300 ml conical flask, the sample amount was determined and weighed precisely.

Sample amount to be taken (g)=56.1/Assumed hydroxyl value

To each flask including the blank test, 25 ml of phthalic anhydride solution and 5 ml of imidazole solution were added, and then the flask was closed and heated at 100° C. for 50 to 60 minutes for reaction. After the reaction, the flask was cooled to room temperature and its cap and inner wall were washed well with 25 ml of pyridine. To each flask, 50 ml of 0.5 N NaOH aqueous solution was added and 0.5 ml of phenolphthalein solution was added, and then titration with 0.5 N NaOH was conducted by using a 50 ml burette until the color changed to pale pink.

3) Hydroxyl Value Calculation

By using the measured titration values of the blank test and the samples, the hydroxyl value (OH value) was calculated according to the following equation:

$$OH\ value(mgKOH/g) = \frac{(V_B - V_S) \times N \times 56.1 \times F}{Sample\ weight\ (g)}$$

$V_B$=Volume of the titration solution consumed for titrating the blank test (ml)

$V_S$=Volume of the titration solution consumed for titrating the sample (ml)

N=NaOH Normality

F=NaOH Factor

2. Method for Measuring Number Average Molecular Weight (Mn) Through the Hydroxyl Value By using the determined hydroxyl value, the number average molecular weight of each polycarbonate diol prepared in Examples 1-A1 to 2-A15 and Comparative Examples A1 to A4 was calculated according to the following equation:

$$Number\ average\ molecular\ weight\ (Mn) = \frac{56100 \times equivalent\ number}{Determined\ hydroxyl\ value}$$

3. Method for Measuring Poly Dispersity Index (PDI)

PDI measurement was conducted by using gel permeation chromatography method. Concretely, in a gel permeation chromatography equipped with Agilent PLgel 3 um Mixed E column and RI detector using 0.5 ml/min of THF as mobile phase, the analysis was conducted for 35 minutes and the measured PDI value was ascertained. For each of the prepared polycarbonate diol, 0.1 g to 0.2 g of polycarbonate diol sample was dissolved in 8 g to 10 g of THF (mobile phase), and the undissolved part in the solution was filtered through syringe filter and the obtained solution was used as the sample for analysis.

4. Method for Measuring Amount of Residual Phenol

By using phenol as an external standard of gas chromatography, the calibration curve was made and through it the quantitative analysis was conducted for the measurement. For each of the prepared polycarbonate diol, 0.1 g to 0.2 g of polycarbonate diol sample was dissolved in acetonitrile, and the undissolved part in the solution was filtered through syringe filter and the obtained solution was used as the sample for analysis.

With the same method, each of 50 ppm, 500 ppm and 1,000 ppm of phenol standard was dissolved in acetonitrile, and the analysis was conducted by using a gas chromatography equipped with DB-1 column and using highly pure Ar as mobile phase. By using concentration of the standard and the integral value of the measured peak, the calibration curve was made, and the amount of phenol in the sample for analysis was calculated from the calibration curve and the integral value of the peak measured at the same time in the sample for analysis, and thereby the amount of residual phenol in the total solid phase was obtained through calculation with the amount of the obtained sample. At that time, the detection limit was set as 50 ppm.

5. Method for Measuring Color

Gardner color index was measured according to ASTM D 1544 by using CM-5 of Konica Minolta capable of measuring Gardner color index. For each of the prepared polycarbonate diol, a solution prepared by dissolving polycarbonate diol in acetonitrile with 20 vol % concentration was used as a sample for analysis to measure Gardner color index.

The above properties of the prepared polycarbonate diol are shown in the following Table 1.

TABLE 1

| | | State | Gardner color index | Hydroxyl value | Mn (g/mol) | PDI | Amount of residual phenol |
|---|---|---|---|---|---|---|---|
| Example | 1-A1 | Liquid | 1 or less | 185.9 | 603.5 | 1.64 | below 50 ppm |
| | 1-A2 | | | 56.2 | 1,997.5 | 1.25 | |
| | 1-A3 | | | 22.6 | 4,956.4 | 1.54 | |
| | 1-A4 | | | 56.0 | 2,004.5 | 1.35 | |
| | 1-A5 | | | 56.4 | 1,989.9 | 1.49 | |
| | 1-A6 | | | 180.6 | 621.1 | 1.66 | |
| | 1-A7 | | | 56.2 | 1,996.5 | 1.44 | |
| | 1-A8 | | | 22.2 | 5,054.1 | 1.58 | |
| | 1-A9 | | | 184.4 | 608.4 | 1.65 | |
| | 1-A10 | | | 22.3 | 5,023.2 | 1.72 | |
| | 1-A11 | | | 187.5 | 598.4 | 1.46 | |
| | 1-A12 | | | 55.7 | 2,015.6 | 1.35 | |
| | 1-A13 | | | 22.2 | 5,047.6 | 1.25 | |
| | 1-A14 | | | 53.9 | 2,080.6 | 1.84 | |
| | 1-A15 | | | 54.8 | 2,047.6 | 1.84 | |
| | 2-A1 | Liquid | 1 or less | 104.0 | 1,079.3 | 1.58 | |
| | 2-A2 | Solid | | 54.1 | 2,073.9 | 1.17 | |
| | 2-A3 | Liquid | | 53.2 | 2,109.0 | 1.89 | |
| | 2-A4 | Solid | | 165.5 | 677.9 | 1.24 | |
| | 2-A5 | Liquid | | 21.9 | 5,123.3 | 1.36 | |
| | 2-A6 | Liquid | | 101.7 | 1,103.3 | 1.94 | |
| | 2-A7 | Solid | | 56.2 | 1,996.5 | 1.85 | |
| | 2-A8 | Liquid | | 53.8 | 2,085.6 | 1.44 | |
| | 2-A9 | Solid | | 184.4 | 608.4 | 1.67 | |
| | 2-A10 | Liquid | | 22.3 | 5,023.2 | 1.85 | |
| | 2-A11 | Liquid | 1 | 104.8 | 1,070.2 | 1.64 | |
| | 2-A12 | Solid | 1 | 55.5 | 2,020.5 | 1.85 | |
| | 2-A13 | Liquid | 1 | 56.2 | 1,995.8 | 1.62 | |
| | 2-A14 | Solid | 1 | 193.3 | 580.4 | 1.24 | |
| | 2-A15 | Liquid | 1 | 22.5 | 4,980.6 | 1.42 | |
| Comparative Example | A1 | Liquid | 3 | 55.5 | 2,020.5 | 1.64 | |
| | A2 | Solid | 2 | 51.2 | 2,190.1 | 1.65 | |
| | A3 | Solid | 3 | 53.5 | 2,097.2 | 1.45 | |
| | A4 | Liquid | 3 or more | 52.7 | 2,129.0 | 1.87 | |

As shown in Table 1, the polycarbonate diols of Examples 1-A1 to 2-A15 according to the present invention had the target number average molecular weight (for example, a number average molecular weight of 500 to 6,000) and the residual phenol amount of the poly carbonate diols was below the detection limit 50 ppm, and the Gardner color index of the polycarbonate diols was 1 or less giving very transparent and colorless state. In addition, according to the amount ratio of anhydrohexitol, polycarbonate diol could be prepared in liquid or solid state (particularly, solid state could be obtained as the anhydrohexitol content in the diol component increased).

However, the polycarbonate diols of Comparative Examples A1 to A4 having no repeated units derived from ether diol of anhydrohexitol had the Gardner color index of 2 or more giving colored state, and thus in case of application to outside of a substrate, bad feeling to the appearance due to the color may be caused, and so there was difficulty for use in a paint, coating agent, adhesive, etc. applied to outside of a substrate.

Preparation of polyurethane by using the prepared polycarbonate diol

Example 1-B1: Preparation of Polyurethane by Using Polycarbonate Diol Prepared in Example 1-A1

200 g of polycarbonate diol prepared in Example 1-A1 and sufficiently dried at 80° C. for 24 hours under vacuum and 165.9 g of 4,4'-methylenediphenyl diisocyanate were put into a 4-necked flask, and reacted under nitrogen atmosphere while maintaining 60° C. for 1 hour to prepare polyurethane prepolymer. The NCO % of the polyurethane prepolymer was measured, and when it reached the theoretical NCO %, 29.9 g of 1,4-butanediol as a chain extender was added and mixed. The mixture was fed into a mold treated with silicone coating and cured at 110° C. for 16 hours to prepare chain-extended polyurethane.

Two stainless steels (25 mm×305 mm) were bent by 90° angle, leaving 241 mm margin in length to have "L" shape (the length of the bent part was about 76 mm). To the longer sides of the two L-shaped stainless steels, the chain-extended polyurethane was uniformly applied with 25 mm×241 mm size, and then the two L-shaped stainless steels were adhered to each other in T-shape, and 1 MPa of pressure was applied thereto by using hot press at 180° C. for 10 minutes to prepare specimen for measuring T-peel strength. T-peel strength was measured by using the prepared specimen and the result was 317.90 MPa.

Example 1-B2: Preparation of Polyurethane by Using Polycarbonate Diol Prepared in Example 1-A2

Excepting that 200 g of polycarbonate diol prepared in Example 1-A2 was used instead of polycarbonate diol prepared in Preparation Example 1-A1, the amount of 4,4'-methylenediphenyl diisocyanate was changed from 165.9 g to 50.1 g and the amount of 1,4-butanediol as a chain extender was changed from 29.9 g to 9.0 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 334.95 MPa.

Example 1-B3: Preparation of Polyurethane by Using Polycarbonate Diol Prepared in Example 1-A3

Excepting that 200 g of polycarbonate diol prepared in Example 1-A3 was used instead of polycarbonate diol prepared in Preparation Example 1-A1, the amount of 4,4'-methylenediphenyl diisocyanate was changed from 165.9 g to 20.2 g and the amount of 1,4-butanediol as a chain extender was changed from 29.9 g to 3.6 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 336.48 MPa.

Example 1-B4: Preparation of Polyurethane by Using Polycarbonate Diol Prepared in Example 1-A4

Excepting that 200 g of polycarbonate diol prepared in Example 1-A4 was used instead of polycarbonate diol prepared in Preparation Example 1-A1, the amount of 4,4'-methylenediphenyl diisocyanate was changed from 165.9 g to 49.9 g and the amount of 1,4-butanediol as a chain extender was changed from 29.9 g to 9.0 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 293.04 MPa.

Example 1-B5: Preparation of Polyurethane by Using Polycarbonate Diol Prepared in Example 1-A5

Excepting that 200 g of polycarbonate diol prepared in Example 1-A5 was used instead of polycarbonate diol prepared in Preparation Example 1-A1, the amount of 4,4'-methylenediphenyl diisocyanate was changed from 165.9 g to 50.3 g and the amount of 1,4-butanediol as a chain extender was changed from 29.9 g to 9.1 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 306.13 MPa.

Example 1-B6: Preparation of Polyurethane by Using Polycarbonate Diol Prepared in Example 1-A6

Excepting that 200 g of polycarbonate diol prepared in Example 1-A6 was used instead of polycarbonate diol prepared in Preparation Example 1-A1, the amount of 4,4'-methylenediphenyl diisocyanate was changed from 165.9 g to 161.2 g and the amount of 1,4-butanediol as a chain extender was changed from 29.9 g to 16.3 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 354.31 MPa.

Example 1-B7: Preparation of Polyurethane by Using Polycarbonate Diol Prepared in Example 1-A7

Excepting that 200 g of polycarbonate diol prepared in Example 1-A7 was used instead of polycarbonate diol prepared in Preparation Example 1-A1, the amount of 4,4'-methylenediphenyl diisocyanate was changed from 165.9 g to 50.1 g and the amount of 1,4-butanediol as a chain extender was changed from 29.9 g to 9.0 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 365.55 MPa.

Example 1-B8: Preparation of Polyurethane by Using Polycarbonate Diol Prepared in Example 1-A8

Excepting that 200 g of polycarbonate diol prepared in Example 1-A8 was used instead of polycarbonate diol prepared in Preparation Example 1-A1, the amount of 4,4'-methylenediphenyl diisocyanate was changed from 165.9 g to 19.8 g and the amount of 1,4-butanediol as a chain extender was changed from 29.9 g to 3.6 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 354.55 MPa.

Example 1-B9: Preparation of Polyurethane by Using Polycarbonate Diol Prepared in Example 1-A9

Excepting that 200 g of polycarbonate diol prepared in Example 1-A9 was used instead of polycarbonate diol prepared in Preparation Example 1-A1, the amount of 4,4'-methylenediphenyl diisocyanate was changed from 165.9 g to 164.5 g and the amount of 1,4-butanediol as a chain extender was changed from 29.9 g to 29.6 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 353.98 MPa.

Example 1-B10: Preparation of Polyurethane by Using Polycarbonate Diol Prepared in Example 1-A10

Excepting that 200 g of polycarbonate diol prepared in Example 1-A10 was used instead of polycarbonate diol prepared in Preparation Example 1-A1, the amount of 4,4'-methylenediphenyl diisocyanate was changed from 165.9 g to 19.9 g and the amount of 1,4-butanediol as a chain extender was changed from 29.9 g to 3.6 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 368.12 MPa.

Example 1-B11: Preparation of polyurethane by using polycarbonate diol prepared in Example 1-A11

Excepting that 200 g of polycarbonate diol prepared in Example 1-A11 was used instead of polycarbonate diol prepared in Preparation Example 1-A1, the amount of 4,4'-methylenediphenyl diisocyanate was changed from 165.9 g to 167.3 g and the amount of 1,4-butanediol as a chain extender was changed from 29.9 g to 30.1 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 298.41 MPa.

Example 1-B12: Preparation of Polyurethane by Using Polycarbonate Diol Prepared in Example 1-A12

Excepting that 200 g of polycarbonate diol prepared in Example 1-A12 was used instead of polycarbonate diol prepared in Preparation Example 1-A1, the amount of 4,4'-methylenediphenyl diisocyanate was changed from 165.9 g to 49.7 g and the amount of 1,4-butanediol as a chain extender was changed from 29.9 g to 9.0 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 312.73 MPa.

Example 1-B13: Preparation of Polyurethane by Using Polycarbonate Diol Prepared in Example 1-A13

Excepting that 200 g of polycarbonate diol prepared in Example 1-A13 was used instead of polycarbonate diol prepared in Preparation Example 1-A1, the amount of 4,4'-methylenediphenyl diisocyanate was changed from 165.9 g to 19.8 g and the amount of 1,4-butanediol as a chain extender was changed from 29.9 g to 3.6 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 324.06 MPa.

Example 1-B14: Preparation of Polyurethane by Using Polycarbonate Diol Prepared in Example 1-A14

Excepting that 200 g of polycarbonate diol prepared in Example 1-A14 was used instead of polycarbonate diol prepared in Preparation Example 1-A1, the amount of 4,4'-methylenediphenyl diisocyanate was changed from 165.9 g to 48.1 g and the amount of 1,4-butanediol as a chain extender was changed from 29.9 g to 8.7 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 286.52 MPa.

Example 1-B15: Preparation of polyurethane by using polycarbonate diol prepared in Example 1-A15

Excepting that 200 g of polycarbonate diol prepared in Example 1-A15 was used instead of polycarbonate diol prepared in Preparation Example 1-A1, the amount of 4,4'-methylenediphenyl diisocyanate was changed from 165.9 g to 48.9 g and the amount of 1,4-butanediol as a chain extender was changed from 29.9 g to 8.8 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 271.26 MPa.

Comparative Example 1-B1: Preparation of Polyurethane by Using Polycarbonate Diol Prepared in Comparative Example A1

Excepting that 200 g of polycarbonate diol prepared in Comparative Example A1 was used instead of polycarbonate diol prepared in Preparation Example 1-A1, the amount of 4,4'-methylenediphenyl diisocyanate was changed from 165.9 g to 49.5 g and the amount of 1,4-butanediol as a chain extender was changed from 29.9 g to 8.9 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 197.40 MPa.

Comparative Example 1-B2: Preparation of Polyurethane by Using Polycarbonate Diol prepared in Comparative Example A2

Excepting that 200 g of polycarbonate diol prepared in Comparative Example A2 was used instead of polycarbonate diol prepared in Preparation Example 1-A1, the amount of 4,4'-methylenediphenyl diisocyanate was changed from 165.9 g to 45.7 g and the amount of 1,4-butanediol as a chain extender was changed from 29.9 g to 8.2 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 180.46 MPa.

Comparative Example 1-B3: Preparation of Polyurethane by Using Polycarbonate Diol Prepared in Comparative Example A3

Excepting that 200 g of polycarbonate diol prepared in Comparative Example A3 was used instead of polycarbonate diol prepared in Preparation Example 1-A1, the amount of 4,4'-methylenediphenyl diisocyanate was changed from 165.9 g to 47.7 g and the amount of 1,4-butanediol as a chain extender was changed from 29.9 g to 8.6 g, the same method as Example 1-B1 was conducted to prepare chain-extended polyurethane, and the same method as Example 1-B1 was conducted to prepare specimen by using the chain-extended polyurethane. T-peel strength was measured by using the prepared specimen and the result was 182.91 MPa.

Method for Measuring T-peel Strength

For the specimen prepared in Examples 1-B1 to 1-B15 and Comparative Examples 1-B1 to 1-B3, T-peel strength was measured by using Universal Testing Machine (UTM) with fixation of the not-adhered part at a rate of 254 mm/min.

The T-peel strength of the prepared specimen is shown in the following Table 2.

TABLE 2

|  |  | Polycarbonate diol (amount: g) | Polyisocyanate (amount: g) | Chain extender (amount: g) | T-peel strength (MPa) |
|---|---|---|---|---|---|
| Example | 1-B1 | Example 1-A1 (200) | MDI (165.9) | BD (29.9) | 317.90 |
|  | 1-B2 | Example 1-A2 (200) | MDI (50.1) | BD (9.0) | 334.95 |
|  | 1-B3 | Example 1-A3 (200) | MDI (20.2) | BD (3.6) | 336.48 |
|  | 1-B4 | Example 1-A4 (200) | MDI (49.9) | BD (9.0) | 293.04 |
|  | 1-B5 | Example 1-A5 (200) | MDI (50.3) | BD (9.1) | 306.13 |
|  | 1-B6 | Example 1-A6 (200) | MDI (161.2) | BD (16.3) | 354.31 |
|  | 1-B7 | Example 1-A7 (200) | MDI (50.1) | BD (9.0) | 365.55 |
|  | 1-B8 | Example 1-A8 (200) | MDI (19.8) | BD (3.6) | 354.55 |
|  | 1-B9 | Example 1-A9 (200) | MDI (164.5) | BD (29.6) | 353.98 |
|  | 1-B10 | Example 1-A10 (200) | MDI (19.9) | BD (3.6) | 368.12 |
|  | 1-B11 | Example 1-A11 (200) | MDI (167.3) | BD (30.1) | 298.41 |
|  | 1-B12 | Example 1-A12 (200) | MDI (49.7) | BD (9.0) | 312.73 |
|  | 1-B13 | Example 1-A13 (200) | MDI (19.8) | BD (3.6) | 324.06 |
|  | 1-B14 | Example 1-A14 (200) | MDI (48.1) | BD (8.7) | 286.52 |
|  | 1-B15 | Example 1-A15 (200) | MDI (48.9) | BD (8.8) | 271.26 |
| Comparative Example | 1-B1 | Comparative Example A1 (200) | MDI (49.5) | BD (8.9) | 197.40 |
|  | 1-B2 | Comparative Example A2 (200) | MDI (45.7) | BD (8.2) | 180.46 |
|  | 1-B3 | Comparative Example A3 (200) | MDI (47.7) | BD (8.6) | 182.91 |

MIDI: 4,4'-methylenediphenyl diisocyanate
BD: 1,4-butanediol

As shown in Table 2, since the polyurethane adhesives of Examples 1-B1 to 1-B15 according to the present invention were prepared by using the polycarbonate diols of Examples 1-A1 to 1-A15, respectively, their T-peel strength was excellent as 270 MPa or higher. However, in case of polyurethane adhesives of Comparative Examples 1-B1 to 1-B3 prepared by using the polycarbonate diols of Comparative Examples A1 to A3, respectively, their T-peel strength was poor as 200 MPa or lower.

Example 2-B1: Preparation of Polyurethane by Using Polycarbonate Diol Prepared in Example 2-A1

200 g of polycarbonate diol prepared in Example 2-A1 and sufficiently dried at 80° C. for 24 hours under vacuum and 92.7 g of 4,4'-methylenediphenyl diisocyanate were put into a 4-necked flask, and reacted under nitrogen atmosphere while maintaining 60° C. for 1 hour to prepare polyurethane prepolymer. The NCO % of the polyurethane prepolymer was measured, and when it reached the theoretical NCO %, 16.7 g of 1,4-butanediol as a chain extender was added and mixed. The mixture was fed into a mold treated with silicone coating and cured at 110° C. for 16 hours to prepare chain-extended polyurethane.

To two stainless steels (20 mm×100 mm), the chain-extended polyurethane was uniformly applied in uniform size (20 mm×20 mm), and then the two stainless steels were adhered to each other, and 1 MPa of pressure was applied thereto by using hot press at 180° C. for 10 minutes to prepare specimen for measuring adhesion strength. The adhesion strength of the prepared specimen was measured as 55.46 MPa.

Example 2-B2: Preparation of Polyurethane by Using Polycarbonate Diol Prepared in Example 2-A2

Excepting that 200 g of polycarbonate diol prepared in Example 2-A2 was used instead of polycarbonate diol prepared in Preparation Example 2-A1, the amount of 4,4'-methylenediphenyl diisocyanate was changed from 92.7 g to 48.3 g and the amount of 1,4-butanediol as a chain extender was changed from 16.7 g to 8.7 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 48.67 MPa.

Example 2-B3: Preparation of Polyurethane by Using Polycarbonate Diol Prepared in Example 2-A3

Excepting that 200 g of polycarbonate diol prepared in Example 2-A3 was used instead of polycarbonate diol prepared in Preparation Example 2-A1, the amount of 4,4'-methylenediphenyl diisocyanate was changed from 92.7 g to 47.5 g and the amount of 1,4-butanediol as a chain extender was changed from 16.7 g to 8.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 53.24 MPa.

Example 2-B4: Preparation of Polyurethane by Using Polycarbonate Diol Prepared in Example 2-A4

Excepting that 200 g of polycarbonate diol prepared in Example 2-A4 was used instead of polycarbonate diol prepared in Preparation Example 2-A1, the amount of 4,4'-methylenediphenyl diisocyanate was changed from 92.7 g to 147.7 g and the amount of 1,4-butanediol as a chain extender was changed from 16.7 g to 26.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 45.35 MPa.

Example 2-B5: Preparation of Polyurethane by Using Polycarbonate Diol Prepared in Example 2-A5

Excepting that 200 g of polycarbonate diol prepared in Example 2-A5 was used instead of polycarbonate diol prepared in Preparation Example 2-A1, the amount of 4,4'-methylenediphenyl diisocyanate was changed from 92.7 g to 19.5 g and the amount of 1,4-butanediol as a chain extender was changed from 16.7 g to 3.5 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 40.21 MPa.

Example 2-B6: Preparation of Polyurethane by Using Polycarbonate Diol Prepared in Example 2-A6

Excepting that 200 g of polycarbonate diol prepared in Example 2-A6 was used instead of polycarbonate diol prepared in Preparation Example 2-A1, the amount of 4,4'-methylenediphenyl diisocyanate was changed from 92.7 g to 90.7 g and the amount of 1,4-butanediol as a chain extender was changed from 16.7 g to 16.3 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 55.31 MPa.

Example 2-B7: Preparation Of Polyurethane by Using Polycarbonate Diol Prepared in Example 2-A7

Excepting that 200 g of polycarbonate diol prepared in Example 2-A7 was used instead of polycarbonate diol prepared in Preparation Example 2-A1, the amount of 4,4'-methylenediphenyl diisocyanate was changed from 92.7 g to 50.1 g and the amount of 1,4-butanediol as a chain extender was changed from 16.7 g to 9.0 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 49.64 MPa.

Example 2-B8: Preparation of Polyurethane by Using Polycarbonate Diol Prepared in Example 2-A8

Excepting that 200 g of polycarbonate diol prepared in Example 2-A8 was used instead of polycarbonate diol prepared in Preparation Example 2-A1, the amount of 4,4'-methylenediphenyl diisocyanate was changed from 92.7 g to 48.0 g and the amount of 1,4-butanediol as a chain extender was changed from 16.7 g to 8.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 50.25 MPa.

Example 2-B9: Preparation of Polyurethane by Using Polycarbonate Diol Prepared in Example 2-A9

Excepting that 200 g of polycarbonate diol prepared in Example 2-A9 was used instead of polycarbonate diol prepared in Preparation Example 2-A1, the amount of 4,4'-methylenediphenyl diisocyanate was changed from 92.7 g to 164.5 g and the amount of 1,4-butanediol as a chain extender was changed from 16.7 g to 29.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 46.14 MPa.

Example 2-B10: Preparation of Polyurethane by Using Polycarbonate Diol Prepared in Example 2-A10

Excepting that 200 g of polycarbonate diol prepared in Example 2-A10 was used instead of polycarbonate diol prepared in Preparation Example 2-A1, the amount of 4,4'-methylenediphenyl diisocyanate was changed from 92.7 g to 19.9 g and the amount of 1,4-butanediol as a chain extender was changed from 16.7 g to 3.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 42.11 MPa.

Example 2-B11: Preparation of Polyurethane by Using Polycarbonate Diol Prepared in Example 2-A11

Excepting that 200 g of polycarbonate diol prepared in Example 2-A11 was used instead of polycarbonate diol prepared in Preparation Example 2-A1, the amount of 4,4'-methylenediphenyl diisocyanate was changed from 92.7 g to 93.5 g and the amount of 1,4-butanediol as a chain extender was changed from 16.7 g to 16.8 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 53.45 MPa.

Example 2-B12: Preparation of Polyurethane by Using Polycarbonate Diol Prepared in Example 2-A12

Excepting that 200 g of polycarbonate diol prepared in Example 2-A12 was used instead of polycarbonate diol prepared in Preparation Example 2-A1, the amount of 4,4'-methylenediphenyl diisocyanate was changed from 92.7 g to 49.5 g and the amount of 1,4-butanediol as a chain extender was changed from 16.7 g to 8.9 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 48.99 MPa.

Example 2-B13: Preparation of Polyurethane by Using Polycarbonate Diol Prepared in Example 2-A13

Excepting that 200 g of polycarbonate diol prepared in Example 2-A13 was used instead of polycarbonate diol prepared in Preparation Example 2-A1, the amount of 4,4'-methylenediphenyl diisocyanate was changed from 92.7 g to 50.2 g and the amount of 1,4-butanediol as a chain extender was changed from 16.7 g to 9.0 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 52.14 MPa.

Example 2-B14: Preparation of Polyurethane by Using Polycarbonate Diol Prepared in Example 2-A14

Excepting that 200 g of polycarbonate diol prepared in Example 2-A14 was used instead of polycarbonate diol prepared in Preparation Example 2-A1, the amount of 4,4'-methylenediphenyl diisocyanate was changed from 92.7 g to 172.5 g and the amount of 1,4-butanediol as a chain extender was changed from 16.7 g to 31.1 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 45.55 MPa.

Example 2-B15: Preparation of Polyurethane by Using Polycarbonate Diol Prepared in Example 2-A15

Excepting that 200 g of polycarbonate diol prepared in Example 2-A15 was used instead of polycarbonate diol prepared in Preparation Example 2-A1, the amount of 4,4'-methylenediphenyl diisocyanate was changed from 92.7 g to 20.1 g and the amount of 1,4-butanediol as a chain extender was changed from 16.7 g to 3.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 39.64 MPa.

Comparative Example 2-B1: Preparation of Polyurethane by Using Polycarbonate Diol Prepared in Comparative Example A2

Excepting that 200 g of polycarbonate diol prepared in Comparative Example A2 was used instead of polycarbonate diol prepared in Preparation Example 2-A1, the amount of 4,4'-methylenediphenyl diisocyanate was changed from 92.7 g to 45.7 g and the amount of 1,4-butanediol as a chain extender was changed from 16.7 g to 8.2 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 15.64 MPa.

Comparative Example 2-B2: Preparation of Polyurethane by Using Polycarbonate Diol Prepared in Comparative Example A3

Excepting that 200 g of polycarbonate diol prepared in Comparative Example A3 was used instead of polycarbonate diol prepared in Preparation Example 2-A1, the amount of 4,4'-methylenediphenyl diisocyanate was changed from 92.7 g to 47.7 g and the amount of 1,4-butanediol as a chain extender was changed from 16.7 g to 8.6 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 10.98 MPa.

Comparative Example 2-B3: Preparation of Polyurethane By Using Polycarbonate Diol Prepared in Comparative Example A4

Excepting that 200 g of polycarbonate diol prepared in Comparative Example A4 was used instead of polycarbonate diol prepared in Preparation Example 2-A1, the amount of 4,4'-methylenediphenyl diisocyanate was changed from 92.7 g to 47.0 g and the amount of 1,4-butanediol as a chain extender was changed from 16.7 g to 8.5 g, the same method as Example 2-B1 was conducted to prepare chain-extended polyurethane, and the same method as Example 2-B1 was conducted to prepare specimen by using the chain-extended polyurethane. The adhesion strength of the prepared specimen was measured as 10.25 MPa.

Method for Measuring Adhesion Strength

For the specimen prepared in Examples 2-B1 to 2-B15 and Comparative Examples 2-B1 to 2-B3, adhesion strength (shear strength) was measured by using Universal Testing Machine (UTM) at a rate of 1.3 mm/min.

The adhesion strength (shear strength) of the prepared specimen is shown in the following Table 3.

|  |  | Polycarbonate diol (amount: g) | Polyisocyanate (amount: g) | Chain extender (amount: g) | Adhesion strength (Shear strength: MPa) |
|---|---|---|---|---|---|
| Example | 2-B1 | Example 2-A1 (200) | MDI (92.7) | BD (16.7) | 55.46 MPa |
|  | 2-B2 | Example 2-A2 (200) | MDI (48.3) | BD (8.7) | 48.67 MPa |
|  | 2-B3 | Example 2-A3 (200) | MDI (47.5) | BD (8.6) | 53.24 MPa |
|  | 2-B4 | Example 2-A4 (200) | MDI (147.7) | BD (26.6) | 45.35 MPa |
|  | 2-B5 | Example 2-A5 (200) | MDI (19.5) | BD (3.5) | 40.21 MPa |
|  | 2-B6 | Example 2-A6 (200) | MDI (90.7) | BD (16.3) | 55.31 MPa |
|  | 2-B7 | Example 2-A7 (200) | MDI (50.1) | BD (9.0) | 49.64 MPa |
|  | 2-B8 | Example 2-A8 (200) | MDI (48.0) | BD (8.6) | 50.25 MPa |
|  | 2-B9 | Example 2-A9 (200) | MDI (164.5) | BD (29.6) | 46.14 MPa |
|  | 2-B10 | Example 2-A10 (200) | MDI (19.9) | BD (3.6) | 42.11 MPa |
|  | 2-B11 | Example 2-A11 (200) | MDI (93.5) | BD (16.8) | 53.45 MPa |
|  | 2-B12 | Example 2-A12 (200) | MDI (49.5) | BD (8.9) | 48.99 MPa |
|  | 2-B13 | Example 2-A13 (200) | MDI (50.2) | BD (9.0) | 52.14 MPa |
|  | 2-B14 | Example 2-A14 (200) | MDI (172.5) | BD (31.1) | 45.55 MPa |
|  | 2-B15 | Example 2-A15 (200) | MDI (20.1) | BD (3.6) | 39.64 MPa |
| Comparative Example | 2-B1 | Comparative Example A2 (200) | MDI (45.7) | BD (8.2) | 15.64 MPa |
|  | 2-B2 | Comparative Example A3 (200) | MDI (47.7) | BD (8.6) | 10.98 MPa |
|  | 2-B3 | Comparative Example A4 (200) | MDI (47.0) | BD (8.5) | 10.25 MPa |

MIDI: 4,4'-methylenediphenyl diisocyanate
BD: 1,4-butanediol

As shown in Table 3, since the polyurethane adhesives of Examples 2-B1 to 2-B15 according to the present invention were prepared by using the polycarbonate diols of Examples 2-A1 to 2-A15, respectively, their shear strength was excellent as 39 MPa or higher. However, in case of polyurethane adhesives of Comparative Examples 2-B1 to 2-B3 prepared by using the polycarbonate diols of Comparative Examples A2 to A4, respectively, their shear strength was poor as 16 MPa or lower.

The invention claimed is:
1. A polycarbonate diol comprising:
   (1) repeated units derived from ether diol of anhydrohexitol; and
   (2) repeated units derived from carbonate diester,
   wherein the polycarbonate diol is prepared by reacting a mixture comprising the ether diol of anhydrohexitol and the carbonate diester in the presence of a transesterification catalyst, and
   wherein the amount of the ether diol of anhydrohexitol in the mixture is 30 to 95% by weight, based on total 100% by weight of the mixture.
2. A polycarbonate diol comprising:
   (1) repeated units derived from ether diol of anhydrohexitol;
   (2) repeated units derived from carbonate diester; and
   (3) repeated units derived from anhydrohexitol,
   wherein the polycarbonate diol is prepared by reacting a mixture comprising the ether diol of anhydrohexitol, the carbonate diester and the anhydrohexitol in the presence of a transesterification catalyst, and
   wherein the amount of the ether diol of anhydrohexitol in the mixture is 5 to 60% by weight and the amount of the anhydrohexitol in the mixture is 10 to 45% by weight, based on total 100% by weight of the mixture.
3. The polycarbonate diol of claim 1, wherein the anhydrohexitol is selected from isosorbide (1,4:3,6-dianhydrosorbitol), isomannide (1,4:3,6-dianhydromannitol), isoidide (1,4:3,6-dianhydroiditol) or mixtures thereof.
4. The polycarbonate diol of claim 1, wherein the ether diol of anhydrohexitol is a product obtained by reacting anhydrohexitol and alkylene oxide.
5. The polycarbonate diol of claim 1, wherein the ether diol of anhydrohexitol is a product obtained by reacting anhydrohexitol and ethylene carbonate.
6. The polycarbonate diol of claim 1, wherein the carbonate diester is selected from dialkyl carbonate, diaryl carbonate, alkylene carbonate or combinations thereof.
7. The polycarbonate diol of claim 1, further comprising repeated units derived from aliphatic diol.
8. The polycarbonate diol of claim 1, comprising repeated units having a structure of the following formula 1:

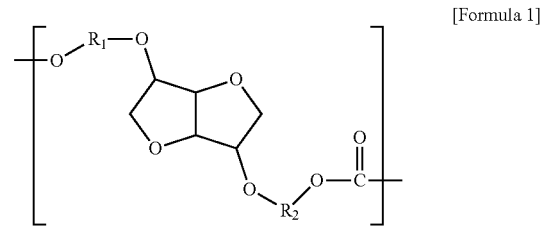

[Formula 1]

wherein each of $R_1$ and $R_2$ is independently a linear or branched alkylene group having 2 to 20 carbons, and $R_1$ and $R_2$ may be the same or different from each other.
9. The polycarbonate diol of claim 2, comprising repeated units having a structure of the following formula 1; and repeated units having a structure of the following formula 2:

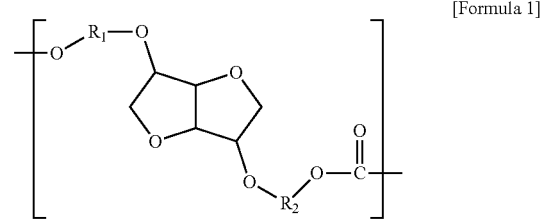

[Formula 1]

wherein each of $R_1$ and $R_2$ is independently a linear or branched alkylene group having 2 to 20 carbons, and $R_1$ and $R_2$ may be the same or different from each other;

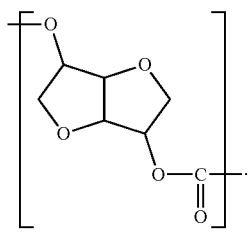

[Formula 2]

10. The polycarbonate diol of claim 7, comprising repeated units having a structure of the following formula 3:

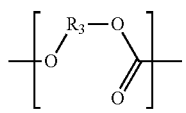

[Formula 3]

wherein $R_3$ is a linear or branched alkylene group having 2 to 10 carbons.

11. A method for preparing a polycarbonate diol, comprising a step of reacting a mixture comprising (i) ether diol of anhydrohexitol and (ii) carbonate diester, in the presence of a transesterification catalyst,
wherein the amount of the ether diol of anhydrohexitol in the mixture is 30 to 95% by weight, based on total 100% by weight of the mixture.

12. A method for preparing a polycarbonate diol, comprising a step of reacting a mixture comprising (i) ether diol of anhydrohexitol, (ii) carbonate diester and (iii) anhydrohexitol, in the presence of a transesterification catalyst,
wherein the amount of the ether diol of anhydrohexitol in the mixture is 5 to 60% by weight and the amount of the anhydrohexitol in the mixture is 10 to 45% by weight, based on total 100% by weight of the mixture.

13. The method for preparing a polycarbonate diol of claim 11, wherein the mixture further comprises aliphatic diol.

14. A polyurethane comprising repeated units derived from the polycarbonate diol of claim 1.

15. A method for preparing a polyurethane, comprising the steps of:
reacting a polyol component and a polyisocyanate component to prepare a prepolymer; and reacting the prepolymer with a chain extender; the method being characterized in that the polyol component comprises the polycarbonate diol of claim 1.

16. An adhesive comprising the polyurethane of claim 14.

17. A paint comprising the polyurethane of claim 14.

18. A coating agent comprising the polyurethane of claim 14.

19. The polycarbonate diol of claim 2, comprising repeated units having a structure of the following formula 3:

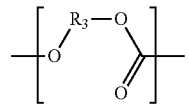

[Formula 3]

wherein $R_3$ is a linear or branched alkylene group having 2 to 10 carbons.

20. The polycarbonate diol of claim 2, wherein the anhydrohexitol is selected from isosorbide (1,4:3,6-dianhydrosorbitol), isomannide (1,4:3,6-dianhydromannitol), isoidide (1,4:3,6-dianhydroiditol) or mixtures thereof.

21. The polycarbonate diol of claim 2, wherein the ether diol of anhydrohexitol is a product obtained by reacting anhydrohexitol and alkylene oxide.

22. The polycarbonate diol of claim 2, wherein the ether diol of anhydrohexitol is a product obtained by reacting anhydrohexitol and ethylene carbonate.

23. The polycarbonate diol of claim 2, further comprising repeated units derived from aliphatic diol.

24. The method for preparing a polycarbonate diol of claim 12, wherein the mixture further comprises aliphatic diol.

25. A polyurethane comprising repeated units derived from the polycarbonate diol of claim 2.

26. A method for preparing a polyurethane, comprising the steps of: reacting a polyol component and a polyisocyanate component to prepare a prepolymer; and reacting the prepolymer with a chain extender; the method being characterized in that the polyol component comprises the polycarbonate diol of claim 2.

27. An adhesive comprising the polyurethane of claim 25.

28. A paint comprising the polyurethane of claim 25.

29. A coating agent comprising the polyurethane of claim 25.

* * * * *